United States Patent [19]
Memory et al.

[11] Patent Number: 6,158,363
[45] Date of Patent: *Dec. 12, 2000

[54] APPARATUS FOR DISPENSING PARTICLES

[75] Inventors: Russell J. Memory; Robert K. Benneweis; Neil D. Klassen; Robert J. Wilson; James N. Wilson, all of Saskatoon, Canada

[73] Assignee: Flexi-Coil Ltd., Saskatoon, Canada

[*] Notice: This patent is subject to a terminal disclaimer.

[21] Appl. No.: 09/455,153

[22] Filed: Dec. 6, 1999

Related U.S. Application Data

[63] Continuation-in-part of application No. 09/316,136, May 21, 1999, Pat. No. 5,996,516.
[51] Int. Cl.$^7$ .............................. G01F 1/00; A01C 7/20
[52] U.S. Cl. ........................................ 111/176; 701/50
[58] Field of Search ............................... 111/174, 176, 111/900, 200; 701/50

[56] References Cited

U.S. PATENT DOCUMENTS

| | | |
|---|---|---|
| 3,595,078 | 7/1971 | Beck et al. . |
| 3,723,989 | 3/1973 | Fathauer et al. . |
| 4,007,754 | 2/1977 | Beck et al. . |
| 4,166,948 | 9/1979 | Steffen . |
| 4,662,749 | 5/1987 | Hatton et al. ............................ 356/336 |
| 5,177,470 | 1/1993 | Repas ........................................ 340/684 |
| 5,621,666 | 4/1997 | O'Neall et al. ........................... 364/555 |
| 5,635,911 | 6/1997 | Landers et al. ........................... 340/674 |
| 5,650,609 | 7/1997 | Mertins et al. ........................ 250/222.2 |
| 5,691,483 | 11/1997 | Linnemann ........................... 73/861.05 |

FOREIGN PATENT DOCUMENTS 2245200   4/1998   Canada .

*Primary Examiner*—Christopher J. Novosad
*Attorney, Agent, or Firm*—Larry W. Miller; J. William Stader

[57] ABSTRACT

An air seeder for planting agricultural crops includes: a storage tank for containing particles to be dispensed; a metering mechanism for transferring particles from the storage tank; an air distribution system for receiving particles from the metering mechanism, the air distribution system comprising a bank of tubes for transporting particles in a flow of air having a flow rate, and a damper mechanism at the bank of tubes for selective control of the flow rate within the bank of tubes; an air flow source for providing a flow of air to the bank of tubes; a particle velocity sensor located at each tube for providing a sensor output signal corresponding to a measured particle velocity; and a control mechanism operably connected to the sensors and to the damper mechanism for selective adjustment of the flow rate in the bank of tubes, the control mechanism being adapted to receive the sensor output signals, normalize the values corresponding to the sensor output signals, and display the normalized values.

16 Claims, 18 Drawing Sheets

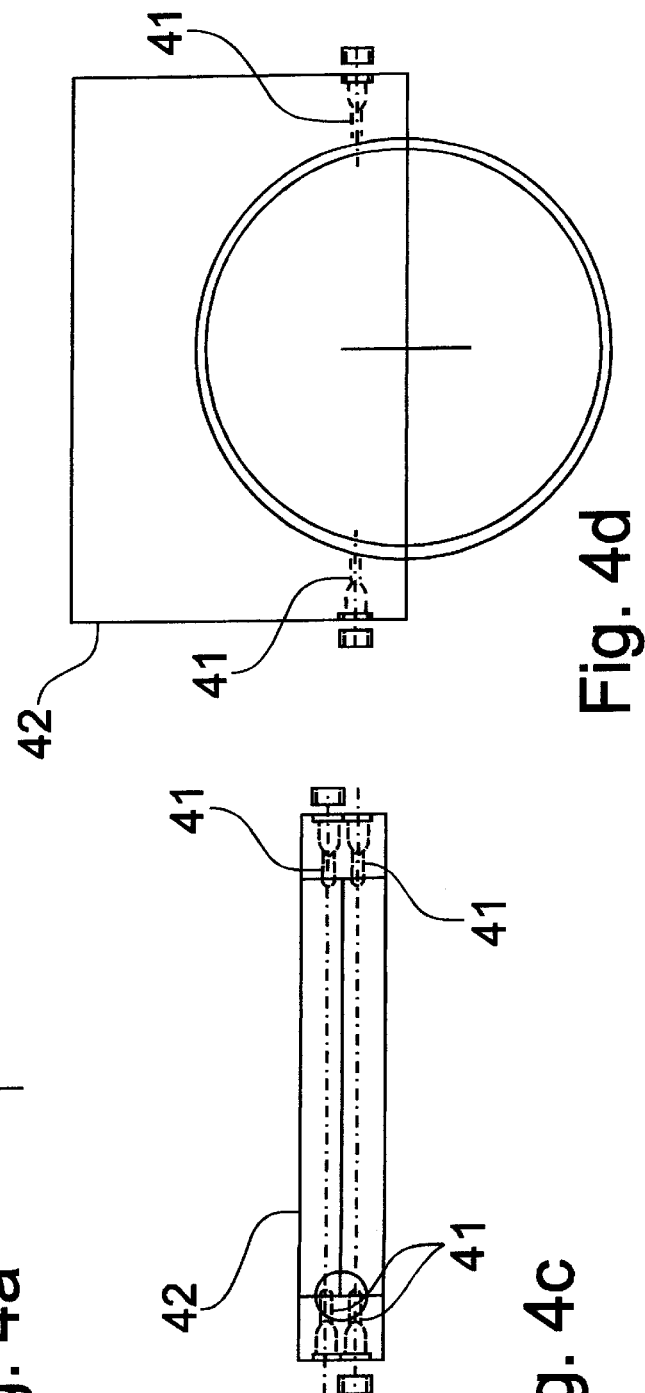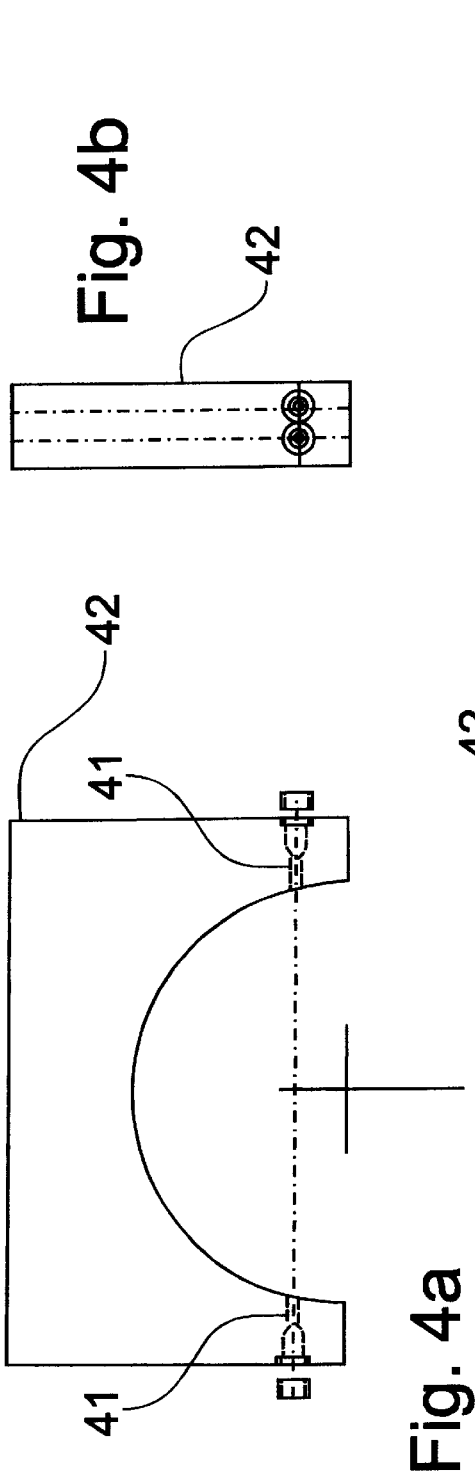

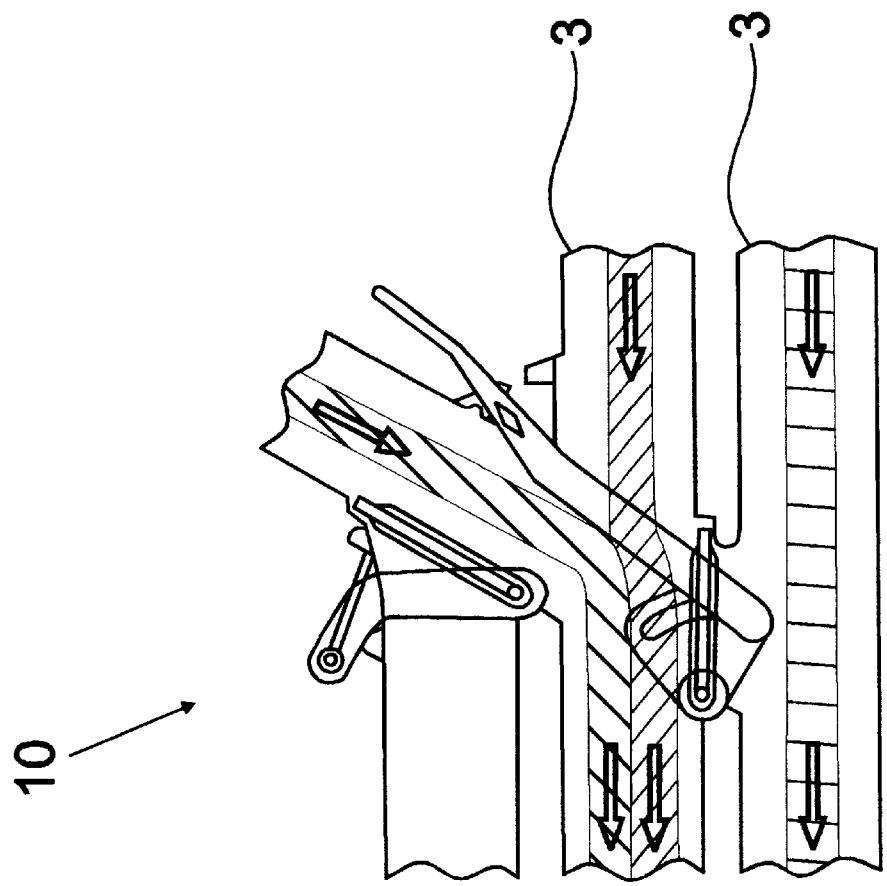

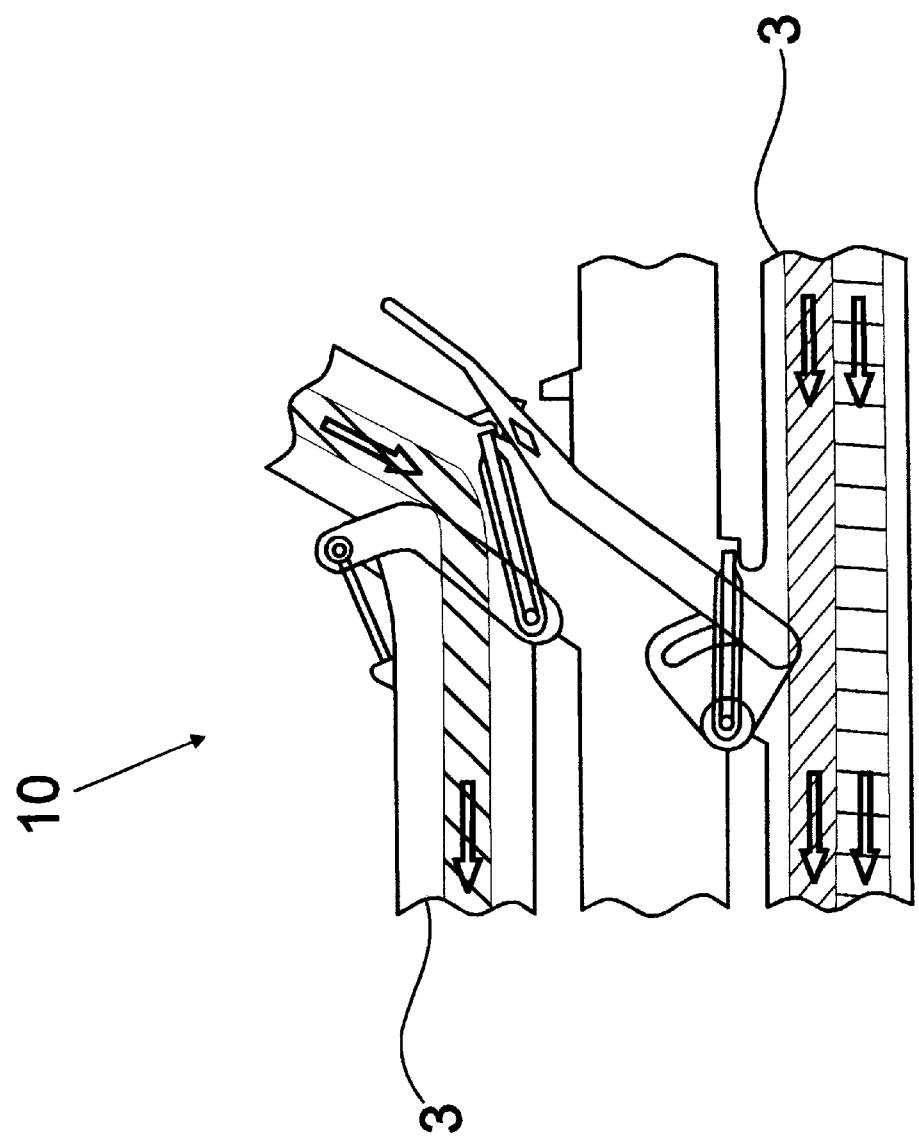

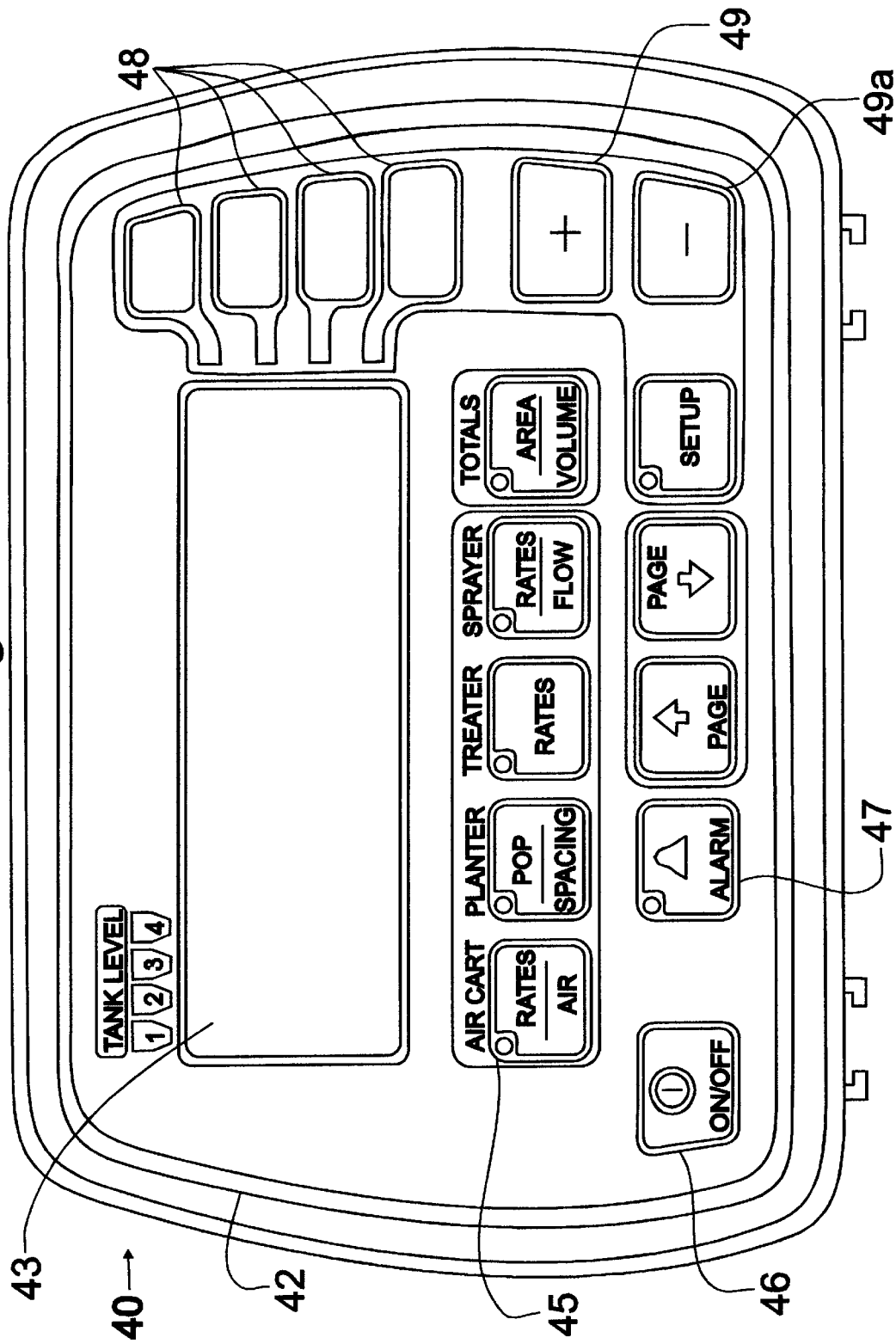

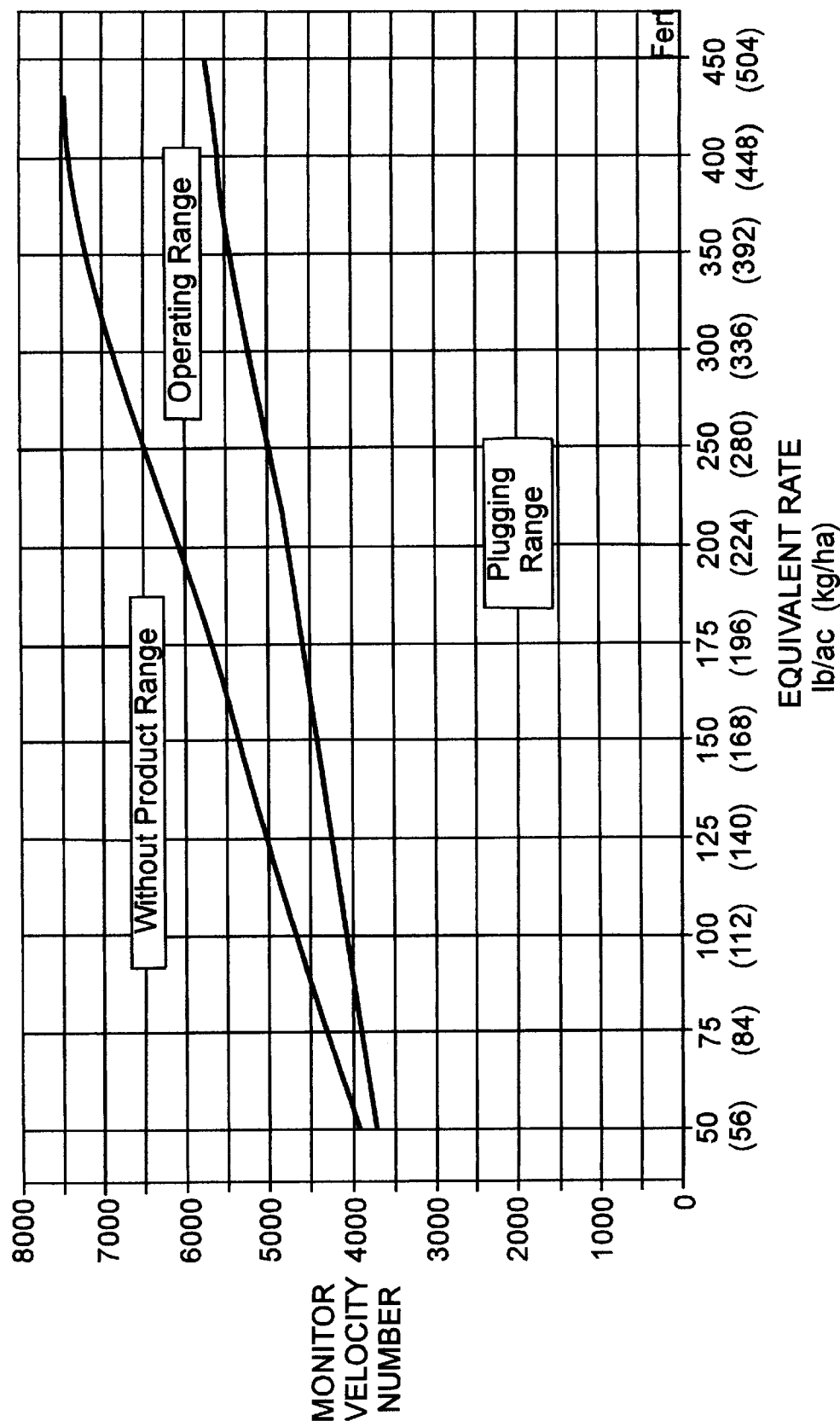

APPARATUS FOR DISPENSING PARTICLES

CROSS-REFERENCE TO RELATED APPLICATIONS

This application is a continuation-in-part of U.S. patent application Ser. No. 09/316,136, filed May 21, 1999, now issued as U.S. Pat. No. 5,996,516, on Dec. 7, 1999.

BACKGROUND OF THE INVENTION

The present invention relates generally to a system for dispensing particles. In particular, the invention relates to an apparatus and method for monitoring and controlling the velocity of particles in a pneumatic product application system.

Agricultural implements such as air seeders and row crop planters employ pneumatic means to convey product such as seed and fertilizer from a centralized hopper to distribution on the ground. Controlling particle flow at an acceptable operating speed can be a difficult task. Too much air velocity and thus increased particle velocity can result in product damage and product bouncing or blowing out of the ground furrow. High particle velocity can also result in increased wear on the plastic air lines of an air seeder and excess consumption of fan power. Too little air velocity can result in plugging of air delivery lines.

The air velocity is difficult to optimize for a number of reasons. The minimum carry velocity varies for different product mass flow rates and for different product types, both of which may change during a field operation.

Another issue adding to the difficulty in optimizing the air flow velocity occurs when the configuration of the cart is altered. The delivery hoses in the air system may be reconfigured in a number of ways upsetting the balance of the air flow system. Even during field operation, if the air seeding system operates on a side slope, the resistance to particle flow will become greater in the line which have raised and vice versa for the lower lines.

Prior art methods of monitoring the particle flow of a system generally count the seeds at some point in the delivery system to ensure the proper number of seeds is being placed into the ground. Other systems simply monitor the air flow velocity, which provides a general indication of operating levels, but is not accurate since different products have different carry velocities.

Many air carts are equipped with methods of adjusting the air flow through the delivery lines by means of damping mechanisms and fan speed adjustment. One such system is disclosed in U.S. patent application Ser. No. 60/086,422. This prior art system requires interaction of the operator to increase or decrease the air velocity.

The drawbacks of prior art include the need for manual adjustments to damping mechanisms and fan speed, complexity of the manual adjustments, and lost time and money on operation and maintenance of the air carts.

There are also further difficulties when the air cart is configured for double or triple shoot applications since each product may have a different carrying velocity.

Thus, there is a need for a system of monitoring and controlling particle velocity automatically in an air delivery system.

SUMMARY OF THE INVENTION

The present invention is directed to an apparatus and method for dispensing particles.

According to the invention, there is provided an air seeder for planting agricultural crops including: a storage tank for containing particles to be dispensed; a metering mechanism for transferring particles from the storage tank; an air distribution system for receiving particles from the metering mechanism, the air distribution system comprising a bank of tubes for transporting particles in a flow of air having a flow rate, and a damper mechanism at the bank of tubes for selective control of the flow rate within the bank of tubes; an air flow source for providing a flow of air to the bank of tubes; a particle velocity sensor located at each tube for providing a sensor output signal corresponding to a measured particle velocity; and a control mechanism operably connected to the sensors and to the damper mechanism for selective adjustment of the flow rate in the bank of tubes, the control mechanism being adapted to receive the sensor output signals, normalize the values corresponding to the sensor output signals, and display the normalized values.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The advantages of this invention will be apparent upon consideration of the following detailed disclosure of the invention, especially when taken in conjunction with the accompanying drawings wherein:

FIGS. 4a to 4d illustrate the mounting brackets and light tunnels of the embodiment of FIG. 1;

FIGS. 6a to 6d illustrate alternative air seeder configurations;

FIG. 11 is a front elevation view of the console and display panel for the air flow control system, the console and display panel being located at a remote location in the prime mover;

FIG. 12 is a velocity chart plotting monitor velocity numbers against an equivalent rate in pounds per acre.

DETAILED DESCRIPTION OF THE PREFERRED EMBODIMENT

Figure 1:
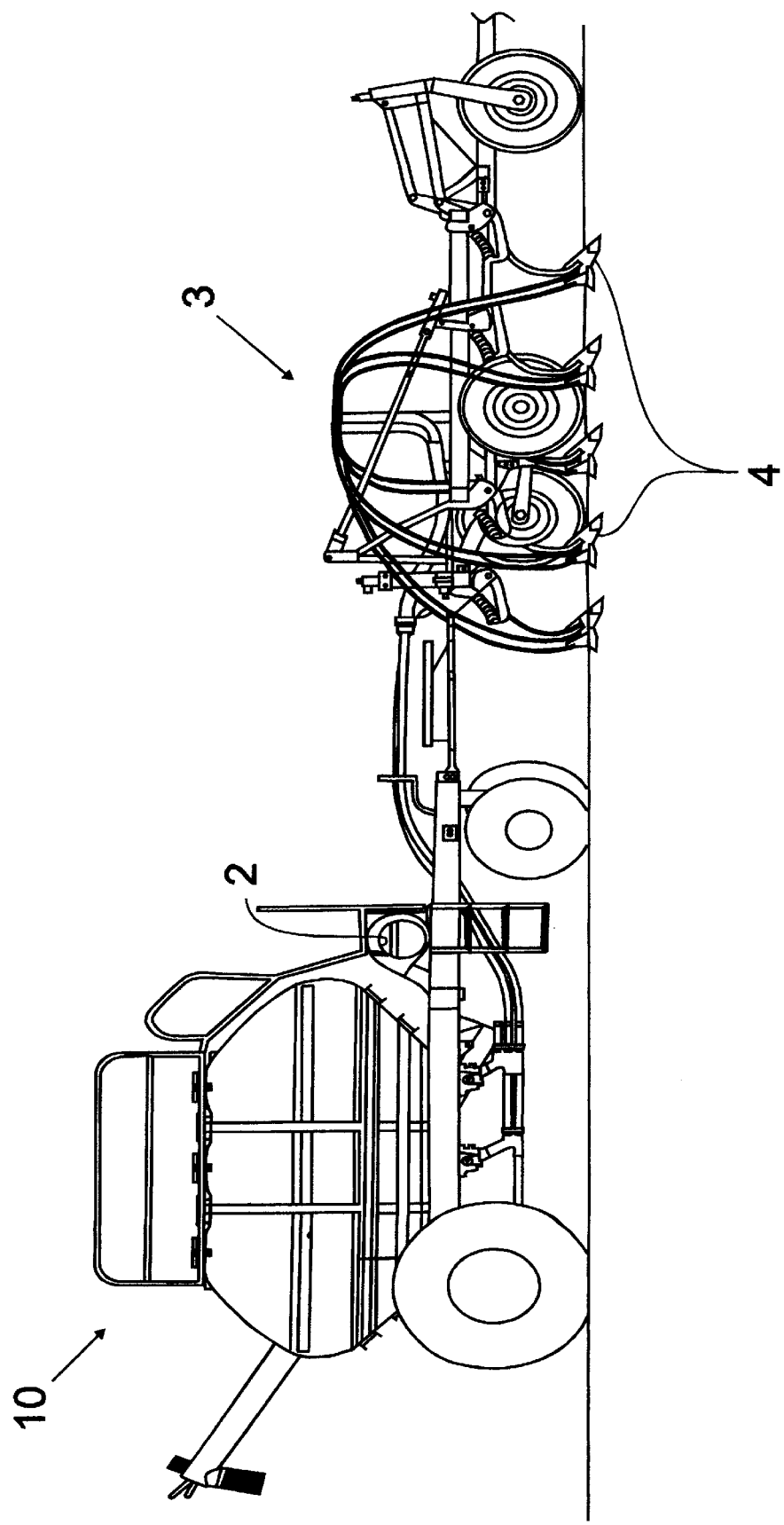
FIG. 1 is a side elevational view of an air seeder embodying the present invention.
Figure 2:
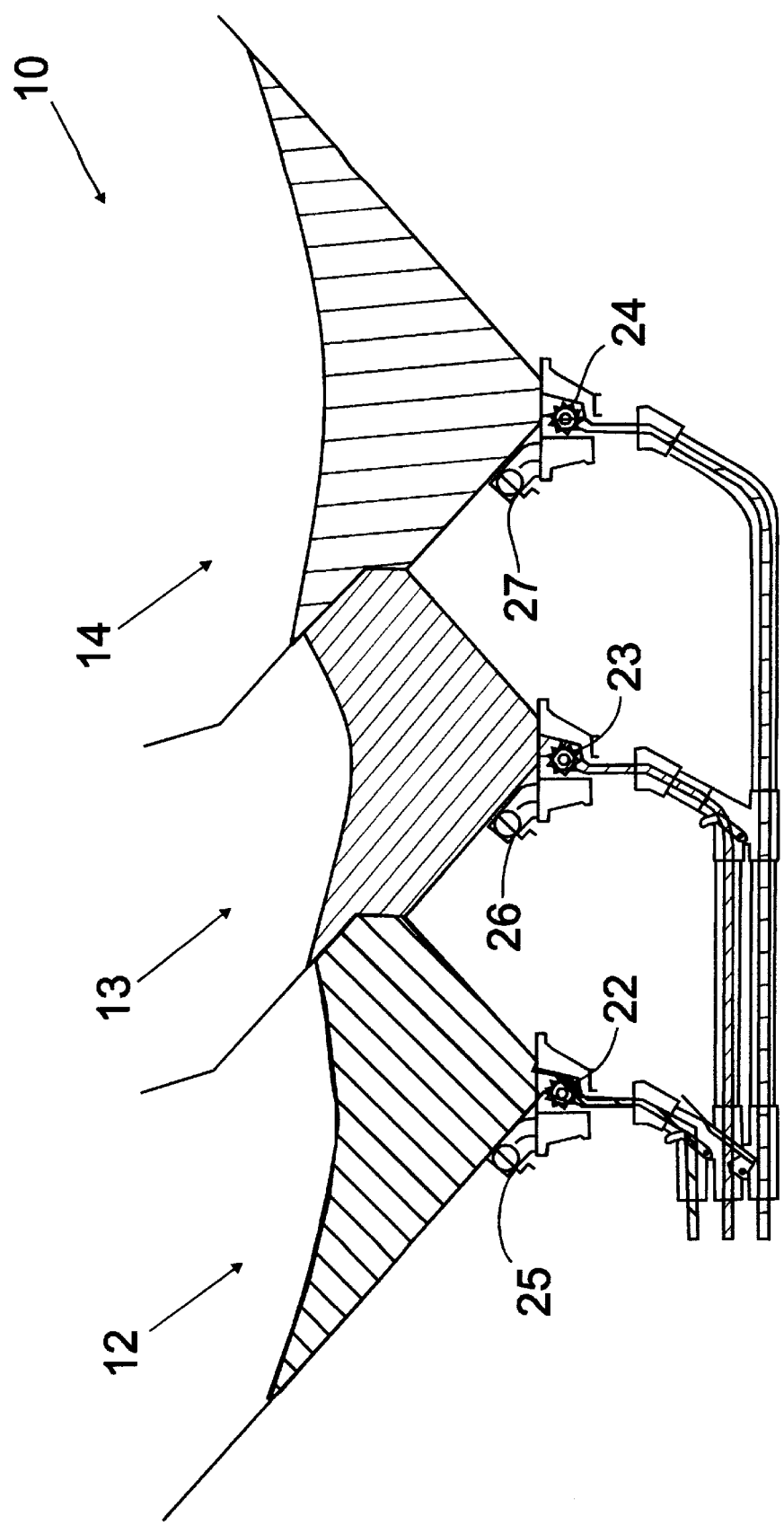
FIG. 2 is a schematic cross sectional view through the tanks of the air seeder of FIG. 1.
Figure 3:
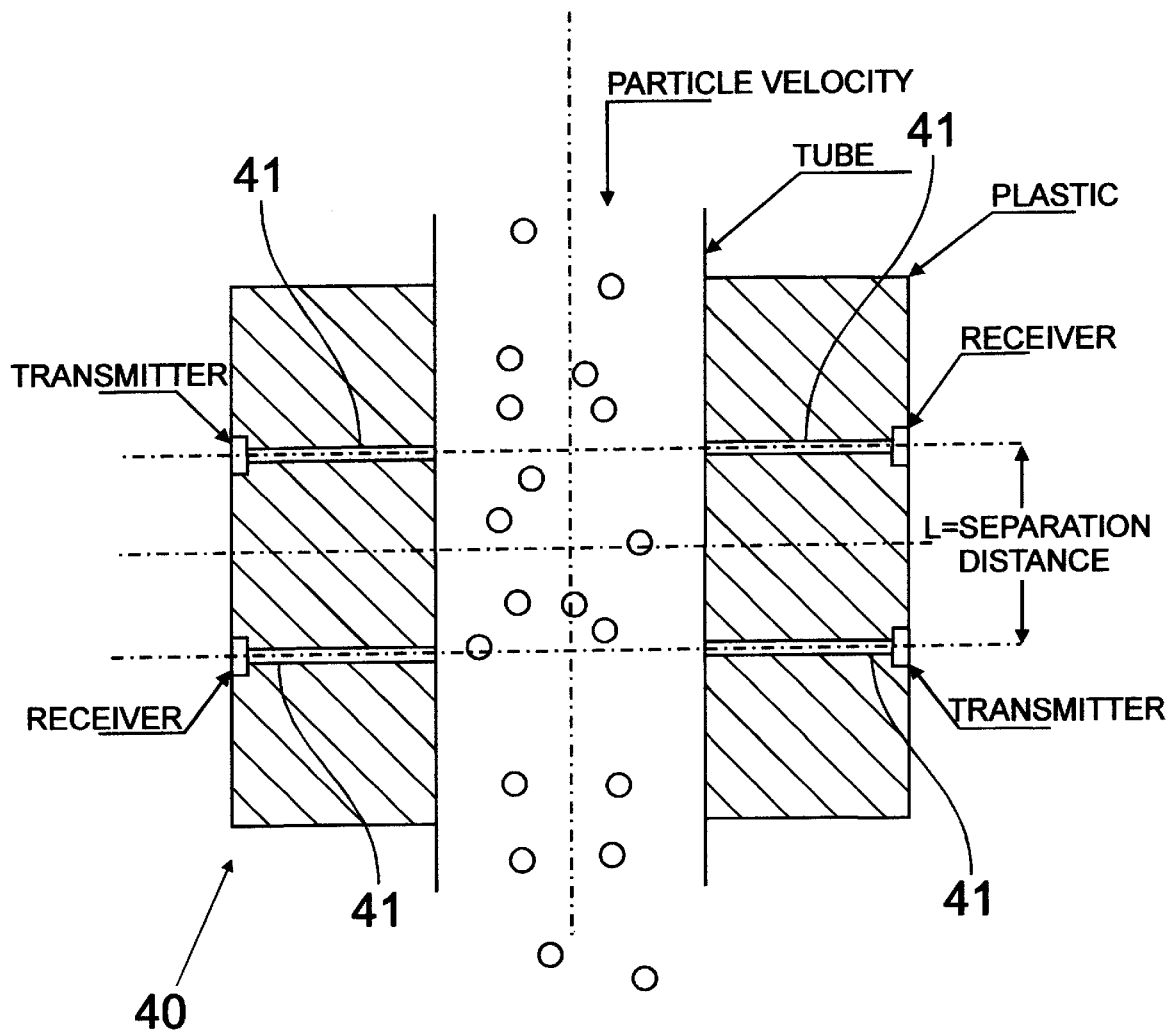
FIG. 3 is a cross sectional view illustrating a single run of the air distribution system of the embodiment of FIG. 1.

FIGS. 1 to 12 depict aspects of an agricultural air cart embodying the present invention. The air cart employs a method of determining particle velocity and a method of utilizing the particle velocity to automatically control the air flow within the air cart.

If a particle or a group of particles passing one point can be identified when passing another point, a know distance downstream, then a time measurement of the two events permits calculation of the particle velocity. The illustrated embodiment relies on beam interruption to produce a pair of signals that can be cross correlated.

Beam interruption sensors are applied to measuring the average velocity across a diameter of a pipe. The sensor is placed in the air delivery system of the agricultural implement. The sensor includes two pairs of optical transmitter-receiver sets located in the same horizontal plane, with one pair being located downstream of the other. In one embodiment, at least one sensor is placed in each run with the sensor mounted just downstream of the intermediate manifold.

The sensor design centres on a processing unit which must measure the optical beam signals and then perform a number of multiplication and addition functions on the signal data in order to calculate a cross correlation function. The particle velocity is then determined from the peak location of the cross correlation function, and this value is used to control the air flow of the air cart and can be output to the user.

A method of detecting the velocity of product being carried by air flow is disclosed. The method involves 1) a first beam being interrupted by a group of particles, 2) a second beam downstream the first beam being interrupted by the same particles at a time $\Delta t$, 3) conversion of the voltage signals from the first and second beams to digital signals, 4) cross correlation to the two signals in order to determine the time lag $\Delta t$, 5) conversion of the time lag to a velocity.

When multiple runs are active in an air cart, one run invariably is more resistant to flow and particles will drop out of the air flow in that run first as the air velocity is reduced. In one embodiment, the average particle velocity is determined in each active run of the air cart. This data is then used by a control system to control the air cart or is displayed to the user on a console unit. The method involves 1) determining the average particle velocity in each run, 2) transmitting this data to a controller, 3) normalizing the velocities, 4) monitoring the system to ensure each bank of runs operate at a minimum particle velocity near the sustainable normalized value.

In the illustrated embodiment, a typical air cart unit 10 consists of a first storage tank 12, second storage tank 13 and a third storage tank 14, metering mechanisms 22, 23, 24, a variable speed fan 2, air cart electronic control (not shown), an air distribution system 3, and possibly earth working tools 4. The air distribution system 3 includes a series of air flow tubes (runs) arranged in respective banks extending from each tank. The electronic control provides electrical control for a metering mechanism corresponding to each of the storage tanks: a first metering mechanism 22 for the first storage tank 12, a second metering mechanism 23 for the second storage tank 13, and a third metering mechanism 24 for the third storage tank 14.

Air flow generated by the fan 2 travels through the tubes, and seed and/or fertilizer is metered into the tubes through the metering mechanisms. The tubes are associated with a plurality of planting tools to deliver the metered material by the flow of air for distributing on the ground. This could be either with use of earthworking tools or a broadcast method.

In one embodiment, each bank of runs is provided with an air damper 25, 26, 27. Each air damper is operable to restrict the flow of air in each bank of runs as function of the rotated position of the damper between a fully open position (unrestricted) to a fully closed position (restricted).

Particle velocity sensors are ideally located in each run of the air distribution system.

In the preferred embodiment, the particle velocity sensor 40 comprises two pairs of optical transmitter-receiver sets, processing unit and microprocessor. Ideally, the transmitters are light emitting diodes and the receivers are near infrared phototransistors. The transmitters are driven with a DC signal and the receiver signals are AC coupled and amplified. The amplification value is such that a reasonably large signal is provided from the smallest particle expected to be used in this system. The optical devices selected result in minimum beam separation in order to obtain accurate particle velocity values.

Preferably, the sensors are placed such that a transmitter of one pair is located adjacent to a receiver of the other pair to minimize optical signal coupling between the transmitter of one pair and the receiver of the other pair.

Preferably, the sensors are located just above the centerline of the air flow tube cross section.

Preferably, light tunnels 41 are used to reduce the possibility of light from one transmitter being reflected from a passing particle to the adjacent receiver. The light tunnels are preferably configured such that their depth is sufficient to prevent a receiver from detecting light reflected from particles. The light tunnels are illustrated in FIG. 4. The bracket is mounted over an optically transparent section of tube through which the particles pass.

The sensors are held in position by mounting brackets 42. The mounting bracket 42 is ideally of an optically opaque PVC plastic for ease of machining. The brackets are illustrated in FIG. 4.

During operation, product is metered from the centralized hopper into the air stream supplied by the fan. The product entrained air travels through the air distribution system. In order to control the system, a particle velocity sensor is mounted in each run of the air distribution system. Note that in an embodiment in which particle velocities are simply displayed and there is no automatic control of air flow, it is not necessary to have a sensor in each run. A transmitter-receiver pair is mounted in the exterior of the air distribution tube with a second pair located a fixed distance L downstream. Both pairs are in the same plane. The transmitters and receivers are mounted at the end of small holes drilled in the mounting tubes to collimate the light. Product passing in front of the first transmitter-receiver pair interrupts the first light beam, and a time $\Delta t$ later interrupts the second light beam. The inputs are monitored for transitions indicating beam breakage. When this occurs, the input data is buffered and a cross correlation is performed.

The cross correlation of the optical sensor signals is implemented using a microprocessor. This system consists of a microprocessor board with associated memory and two input (one for each phototransistor signal) and two output analog channels.

Figure 5A:
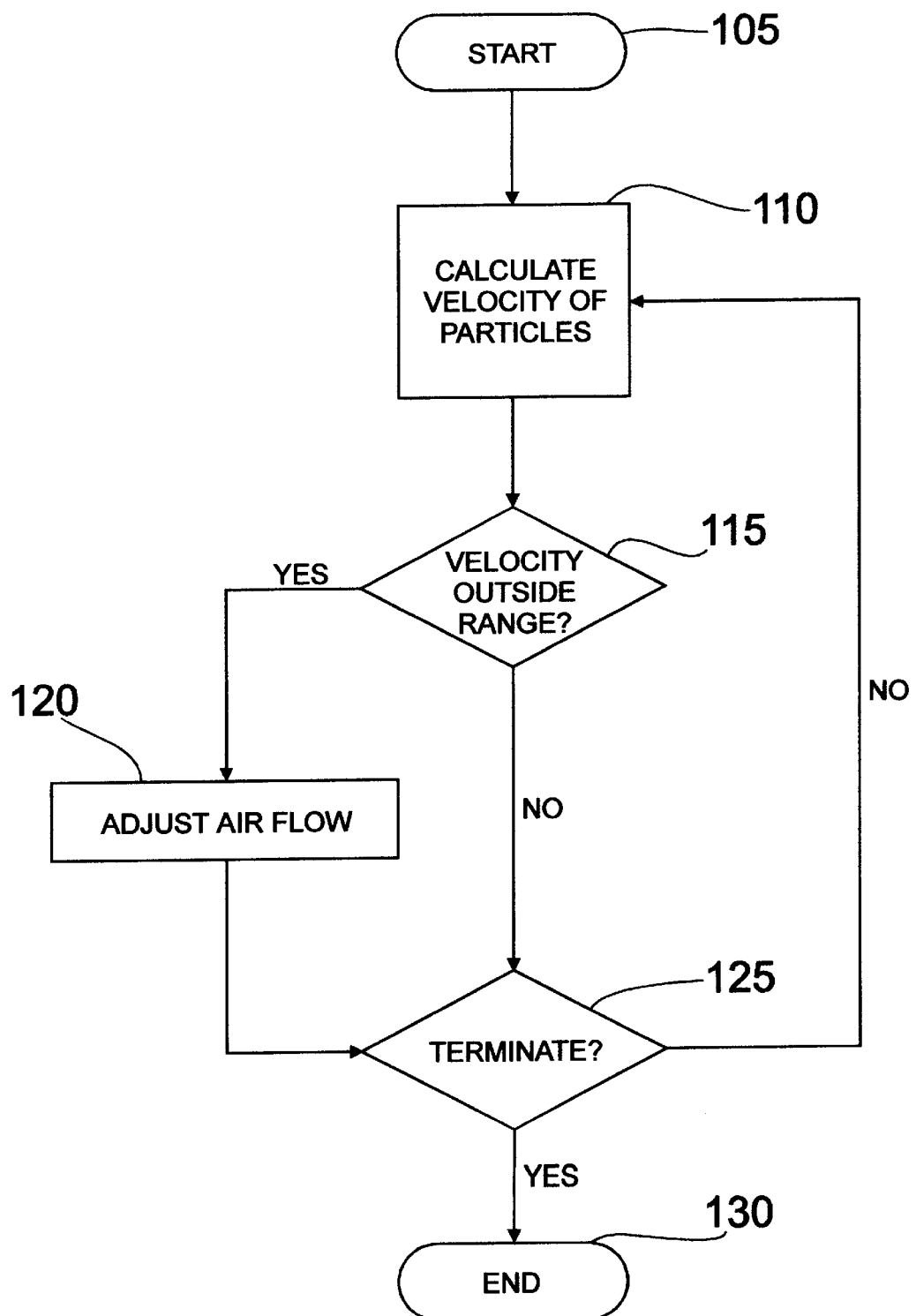
FIG. 5a is a flowchart of a method for controlling particle velocity in accordance with the present invention.
Figure 5B:
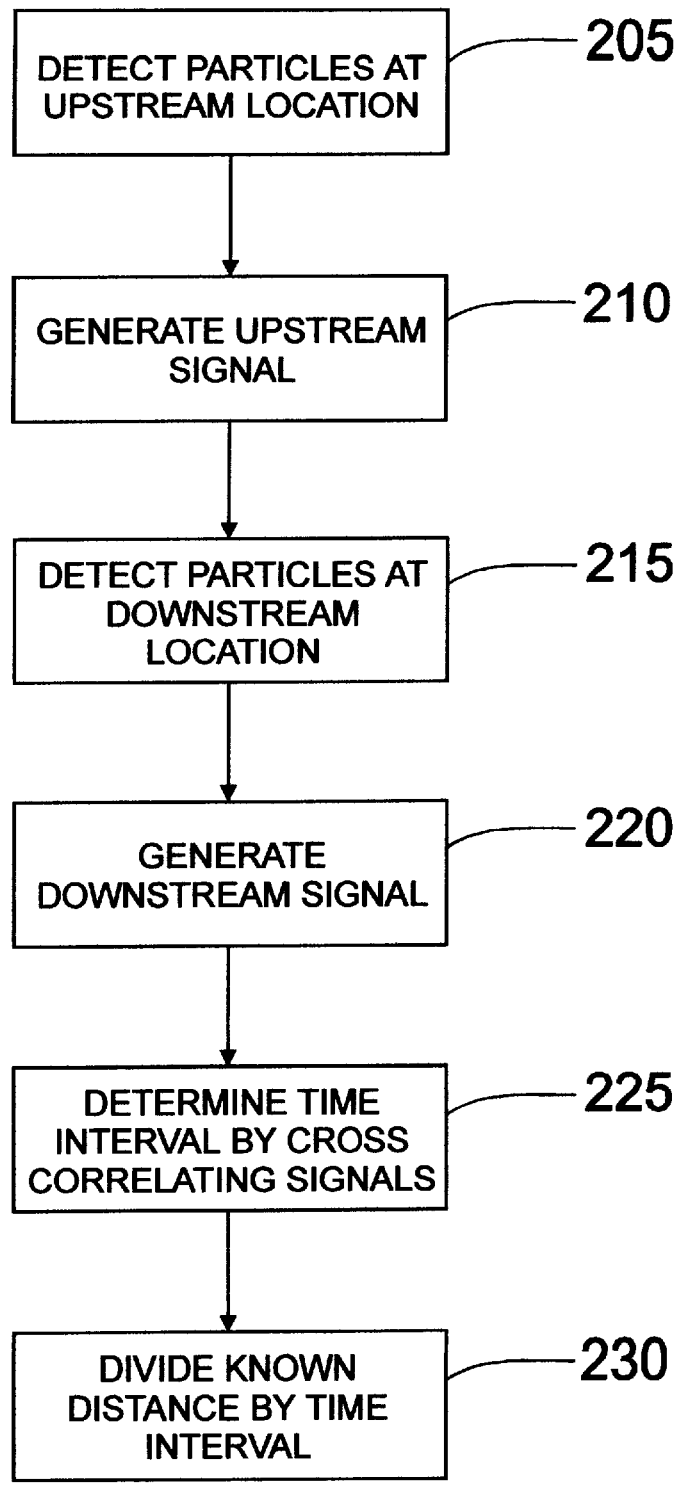
FIG. 5b is a flowchart of a method of calculating particle velocity in accordance with the present invention.
Figure 5C:
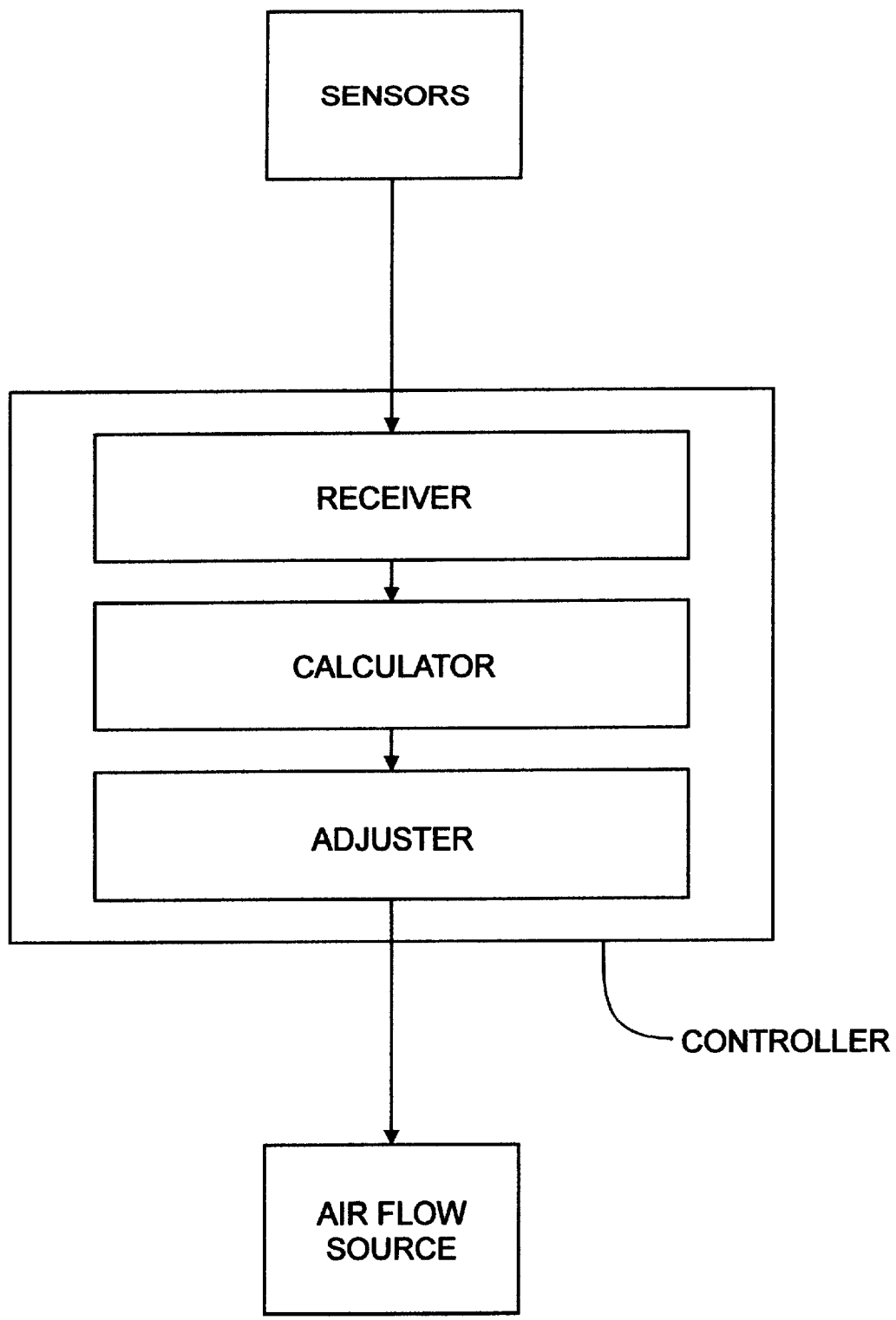
FIG. 5c is a block diagram of a controller of the present invention.

FIGS. 5a to 5c illustrate the method employed by the illustrated embodiment to monitor and control the particle velocity. At Step 105, the method begins upon activation by the operator of the air cart. At Step 110, the velocity of particles in the conduit is calculated. At Step 115, it is determined whether the velocity is below a suitable level. If the velocity is above this level, the velocity of the particles is adjusted at Step 120 by adjusting the air flow. The above steps are repeated so that the particle velocity is continuously monitored and adjusted, until the process is terminated by the operator (Steps 125, 130).

FIG. 5b illustrates the method employed in Step 110 of FIG. 5a to calculate the particle velocity in the conduit. At Step 205, particles are detected at an upstream location in the conduit. At Step 210, an upstream signal corresponding to locations of the particles in the conduit at the upstream location is generated. At Step 215, particles are detected at a downstream location in the conduit, the downstream location being a known distance from the upstream location. At Step 220, a downstream signal corresponding to locations of the particles in the conduit at the downstream location is generated. At Step 225, the time interval between detection of the particles at the upstream location and detection of the particles at the downstream location is determined by cross correlating the upstream and downstream signals. At Step 230, the particle velocity is calculated by dividing the known distance by the time interval.

FIG. 5c is a block diagram of the controller 305, which includes: a processing unit 310 to receive signals from the upstream and downstream sensors; a calculator 315 to calculate a velocity of particles in the conduit; and an adjuster 320 to adjust the flow of air in the conduit as a function of the velocity.

The method includes sampling of the two analog input channels, checking if the sampled signals indicate that a particle (or particles) have passed the sensor, performing a cross correlation on the signals and calculating the lag time to the peak of the correlation signal. The cross correlation function is found by calculating a series of vector dot products, each with a successively large lag time applied to the signal from the second optical sensor. Effectively, the second signal is shifted in time until the two signals are aligned, at which point the product of the two signals is maximized. This time shift represents the transit time of a particle from the first optical beam to the second.

When both optical signals contain points above a minimum threshold value, the starting point of the first signal in the data buffer is determined. From this point, the cross correlation function is determined using a set correlation length. Once the correlation function is calculated, the lag time of the peak value in the function is determined. This is done by finding the two points in the function curve where the value is 95% of the peak value, and then calculating the midpoint of these locations. The purpose of this calculation is to account for cases where the top of the correlation curve is very flat (clipped), which occurs when both optical signals are clipped but of different widths.

There is some variation in signal amplitudes and time delays due to the randomness of the particle motion. Therefore, a number of filtering methods have been implemented in order to smooth the results. A simple low pass filter is used to process the individual particle velocity readings into a running average value. The selected algorithm has a minimum threshold value that a beam interruption signal must exceed in order to be processed into a velocity calculation. As an alternative to using thresholds on both signals, after the cross correlation has been processed its peak value must exceed a minimum threshold in order for the associated velocity to be used in the filter calculation. In addition, if an individual calculated particle velocity deviates from the current running average by more than a present threshold value, that reading is also rejected.

Figure 5D:
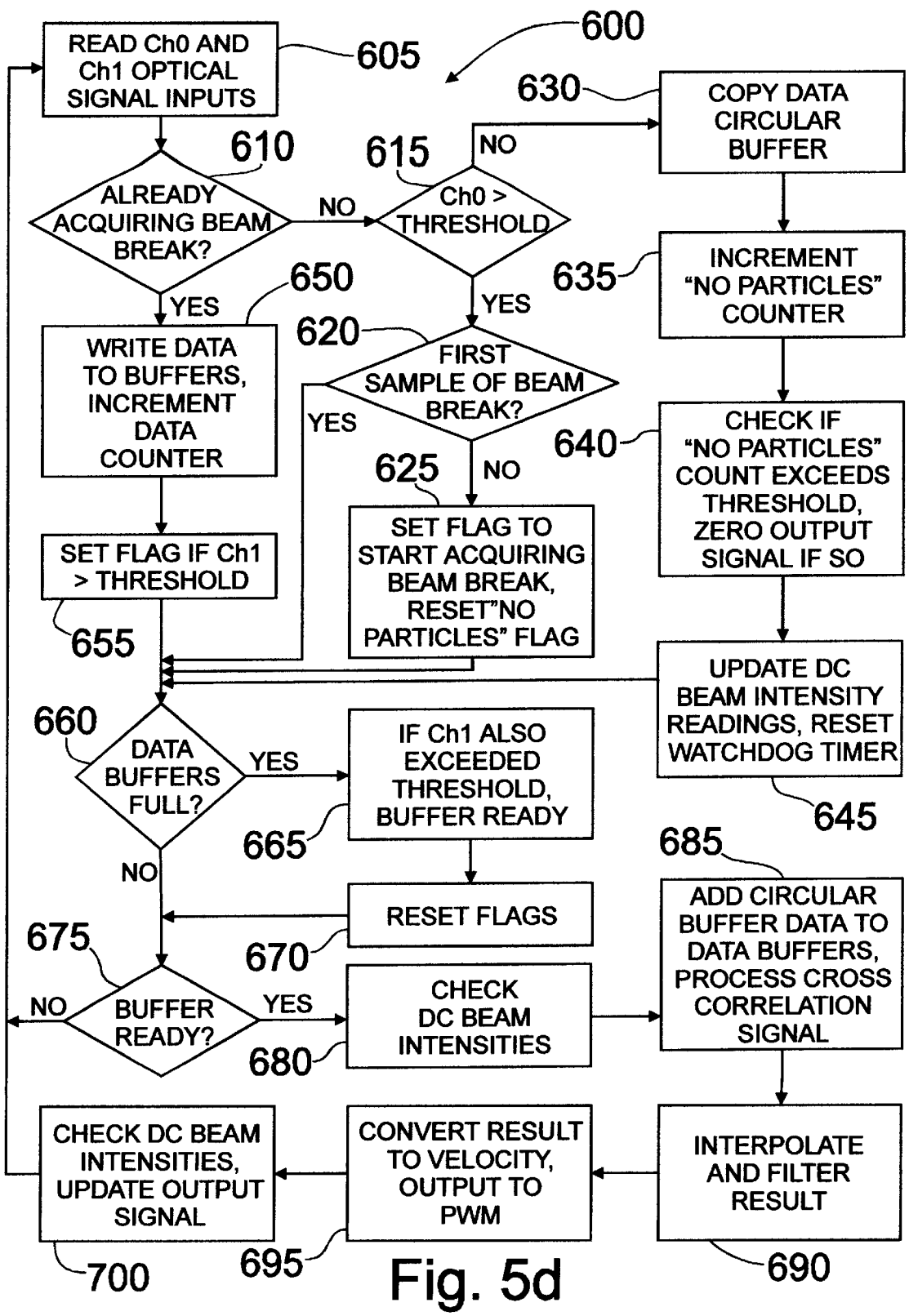
FIG. 5d is a block diagram outlining particle velocity sensor software embodying the present invention.
Figure 6A:
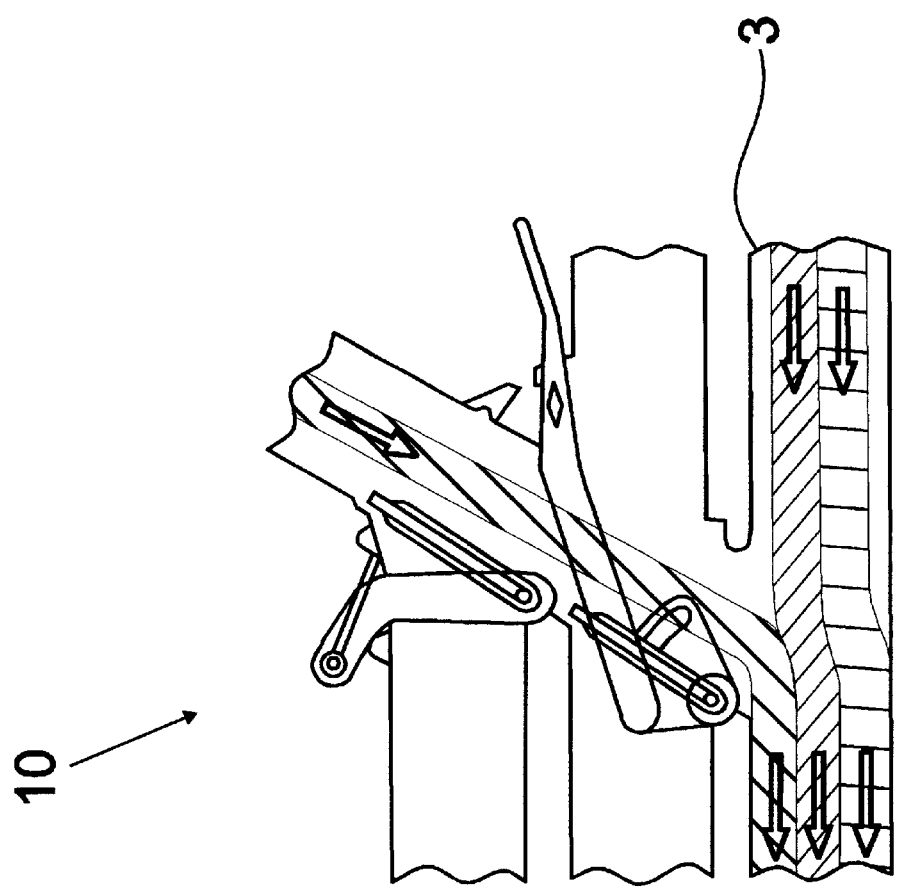
Figure 6D:
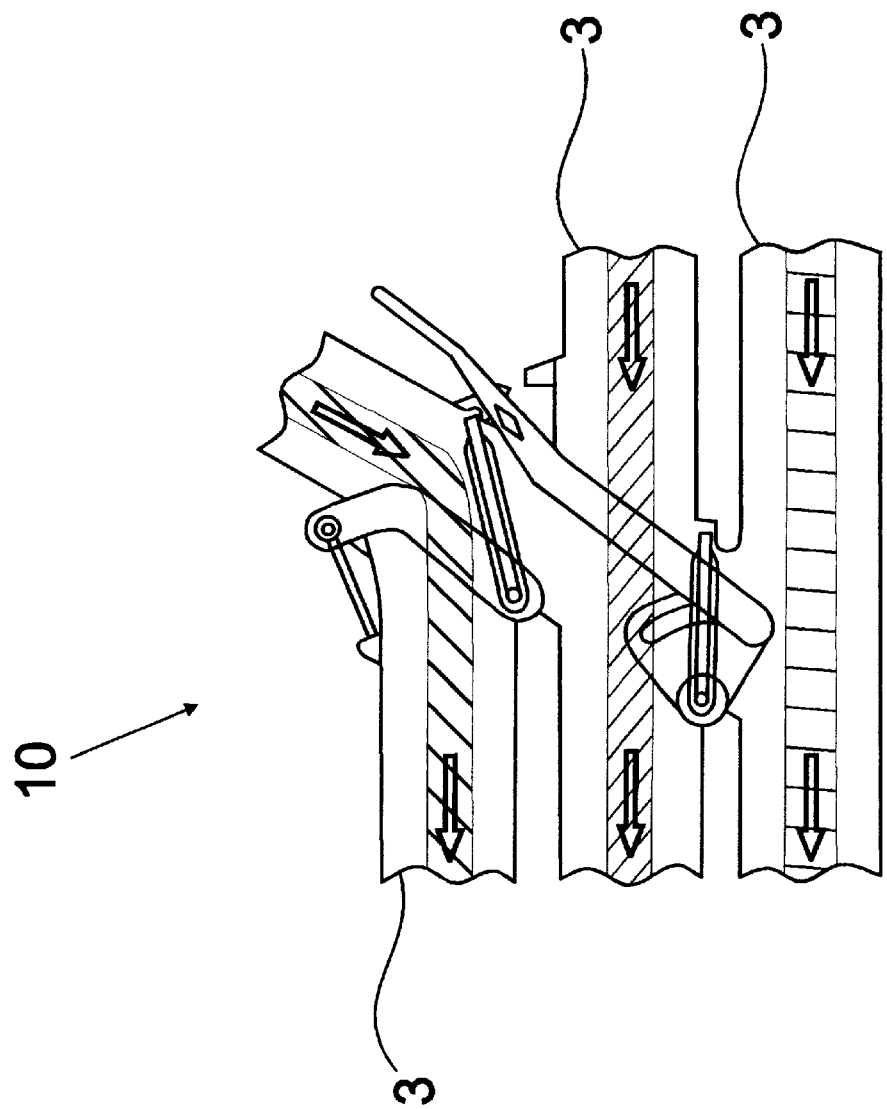

With reference to FIG. 5d, the main loop of the algorithm used to perform the cross correlation reads the results of the AD conversion after the beams are interrupted (step 605) and then checks a number of status flags to determine the next action to be taken. The first flag checked is trans_flag (step 610), a flag that indicates whether a signal transition has already occurred on the first optical beam signal (channel 0). If a transition has not yet occurred, the signal level is checked from the last channel 0 reading to see if the transition threshold has been exceeded (step 615). If it has, then another flag (first_sample_flag) is checked to make sure that this isn't the first sample after a previous particle signal has been processed (step 620). The reason for this is to ensure that a complete particle passage is measured, as opposed to starting a measurement when a particle is already in front of the first beam. If only a partial beam breakage signal is recorded, the resulting correlation measurement can be poor.

If a transition has occurred and this was not the first sample after processing a previous particle, the transition flag trans_flag is set so that the data buffer will start to fill on subsequent AD conversions (step 625). In addition, a flag called no_particle_cycles is reset (step 625). This flag is used to limit the time that the sensor output can remain at a constant value with no new particles being measured. Every AD conversion that occurs when the channel 0 value is below the transition threshold causes this counter to be incremented (step 635). If it reaches a large enough value (representing approximately 0.2 sec.), then the sensor output is set to zero, which indicates that no particles are being detected (step 640).

If the transition threshold has not been exceeded and trans_flag was not set, then the last channel 0 reading is copied into a circular buffer (step 630). This allows readings before the transition point to be included in the cross correlation calculation and prevents useful data from being truncated. The first_sample_flag is reset since the signal level is below the transition threshold and the no_particle_cycles counter is iterated since no particle has yet been detected. If approximately 0.2 sec. has passed with no particles detected (i.e.: no_particle_cycles exceeds a preset threshold), then the sensor output is set to zero (step 640). Also, AD channels 2 and 3 are read to determine the DC level of the optical beam signal through the window in the pipe wall. Higher values indicate greater window blockage, so the two readings are compared and the larger of the two is output to PWM channel 1. Also in this code section between particle samples, the watchdog timer is reset if the watchdog timer counter k has exceeded a preset threshold.

If the transition flag trans_flag had already been set in a previous iteration, then the AD data from both optical beam inputs is copied to data buffers and the data counter index (ind) is incremented (step 650). Also, the signal level from the second optical beam is checked to see if a particle breaks only the first beam and not the second, then its signal will not be processed. The amount of code in the loop that is executed after a transition has been detected is kept to a minimum in order to maximize the effective sampling rate. The counter index is checked to see if the required amount of data for cross correlation processing has been copied to the data buffers (step 660). If so, then ch1_ok flag is checked to verify that the second optical beam was broken in this data set and the buffer_ready flag is then set (Step 665). A number of other flags are reset for subsequent iterations and a counter is incremented to count particles for spacing out future updates of the optical window blockage signal output (Step 670).

If the buffer_ready flag has been set (Step 675), then the correlation for the last particle passage will be calculated (Step 680). The first step in processing the cross correlation of the beam signals is to re-order the circular buffer data at the start of the data buffer for channel 0 (Step 685). Then, instead of computing a complete cross correlation for the entire length of the data buffers, a peak searching algorithm is used in an effort to minimize the calculation time required to determine the peak cross correlation value. Using the peak lag value from the previous iteration as a starting point (set as cur_lag initially), individual cross correlation calculations are carried out at this lag and at this value minus one. This is done using a function called get_results, which scales the calculation and generates a value called result and a value called carry (effectively a scale factor). Another function called cmp_result performs a comparison of the two individual cross correlations. Depending on which of the two results is larger, the algorithm then sets the cur_lag value to go in the direction of increasing results. This process is repeated until the result stops increasing and a decrease is found. At this point, a local peak in the cross correlation function has been located. The search iteration continues only to preset maximum and minimum lag values if no peak is found.

Once the peak lag value has been found, an interpolation is carried out in order to refine the measured value. This is done because the limited sampling rate results in a somewhat coarse measurement resolution. The interpolation involves the use of the individual cross correlation values just above and below the peak result. The amplitude difference between the peak and left value is compared to the difference between the peak and right values. If the right difference is smaller, then the true peak is to the right of the calculated value. An interpolated lag at the new peak value is found by shifting the peak based on the magnitude of the left and right differences. In the calculation, the lag value is also scaled up for improved resolution and calculation accuracy.

The interpolated lag value is then processed in a filtering algorithm, which also rejects individual readings which deviate more than a preset amount from the most recent filtered result value (Step 690). Only a maximum of two consecutive values can be rejected before subsequent values will be incorporated into the filtering calculation. This prevents sudden large deviations in the actual particle velocity from freezing up the calculation of new values. The filtering algorithm itself is a simple weighted filter where the filter output value is a weighted average of the current interpolated measurement and the previous filtered output values. By increasing the weighting on the previous filtered output, the filtering effect is increased. Once the filtered lag value has been determined, it is converted into a value between 0 and 255 for output to PWM channel O. This involves dividing a scaling factor by the lag value. This scaling factor effectively represents a spacing between the optical beams divided by the sampling rate, all scaled by a factor to convert the output to 2 volts=1000 fpm. Because each of the optical sensor mounts has a slightly different effective beam separation distance, there is a different scaling factor for each one.

A concern with the use of an optical technique for particle velocity sensing is the potential for obstruction of the optical window through the pipe wall due to scratching or coating with dust or other contaminants. In order to provide for monitoring of this problem, the second PWM analog output of the CPU board is used to output a signal proportional to the DC level of the received signal at the phototransistor. As the window blockage worsens, this signal increases. The sensor will continue to operate normally until the effects of particle blockage of a beam are too obscured by the window blockage. The point at which this occurs would depend on the type of product being measured.

Initially, the window blockage signals are read and compared with a stored minimum value of each signal. If a new reading is less than the stored value, then it replaces the stored value. The purpose of this is to attempt to compensate for the fact that the DC reading of the optical values are affected by the passage of particles. The readings are taken at random timings relative to the passage of particles, so the values read will be at or above the values expected with no particles passing. When particles are detected, the window blockage signal is updated only every 200 particles and the blockage signals are read twice per particle passage. Therefore, the minimum value out of the 400 readings is used to represent the effective blockage signals. This will generally be a situation in which no particles are in either of the two optical beams. After the filtered lag value has been determined, another check of the window blockage signals is made, and then if 200 particles have past since the last update, another window blockage signal value is calculated and output to PWM channel 1.

The particle velocity sensing apparatus is intended to operate over a range of product sizes from clay carrier with an average diameter of less than one millimeter to peas with an average diameter of seven millimeters. To register an interruption, the particle diameter must cover a significant area of the beam. The algorithm is programmed such that the set correlation length is sufficient to cover the entire passage time for the largest product diameter at the lowest anticipated particle velocity.

Another limitation factored into the design is that the physical size of the transmitters and receivers will dictate the minimum separation between the pairs. In general, the closer the pairs the better the optical correlation. However, the minimum separation is dependent on sensor diameter and/or the required mounting hardware. A larger separation will provide poor correlation but will also result in reduced sampling rates for the same velocity measurement resolution and accordingly will reduce the demands on the processing system. The optical devices used are selected partially on the basis of diameter in order to obtain minimum beam separation.

At least one sensor is provided in each run of the delivery system. The location downstream or upstream in the run has little impact on system performance. Ideally, the sensor is mounted just downstream of the intermediate manifold.

The particle velocity sensors can be utilized in a number of applications. The data provided by the sensors is useful for informing the user of the average particle velocity, in automatic control of the air system and in allowing automatic monitoring and control of optimum flow when more than one product is applied. Another feature of the described invention is detection of blockage or partial blockage of seed delivery lines by monitoring the optical signal levels electronically. Blockage of the delivery lines will result in a decrease in particle velocity. The control system operating on the basis of the optical sensor's particle velocity readings will detect this decrease and counter it with an increase in air velocity and/or inform the users.

In order to utilize the particle velocity sensor for automatic control applications, a method of utilizing the velocity information for control purposes is necessary.

Data from the particle velocity sensors is communicated to an automatic air flow control system. The data is used to determine the lowest allowable fan speed, adjust the air damper, monitor and automatically control the air flow. This eliminates the need for user intervention in adjustments of the air flow system.

Different sizes of product flow at different minimum carry velocities, and also different mass flow rates of the same product flow at different minimum carry velocities. Given the large range of product types and flow rates which must be handled by an air seeder, it is impractical to have tables of all possible combinations of these to use as a basis for control. In addition, when product is introduced into an air stream, it will accelerate for a considerable distance. Given that, for each tank on an air seeder, the sensor mounting locations are at different distances downstream from the metering locations, it follows that the particle velocities at the sensor locations will also be different.

The method used to overcome these problems is to use averaging and normalization of particle velocities. What this means is that for one bank of delivery lines the average of all of the particle velocities for those runs is calculated. Then for each run, its individual velocity is divided by the average. So if a run is close to the average velocity, a number close to one is found. If it is faster than average, the number will be higher than one and vice versa. With a high enough air velocity (ensuring that all product is flowing without blockage or impending blockage), it was found that this ratio is consistent for every individual run. As the air velocity is increased or decreased over range of value, this ratio remains fairly constant. The nominal value of this ratio for each run is found, and dividing the measured ratio by this nominal value results in a normalized relative velocity number.

This normalized relative velocity number is significant because it provides an indication of the relative particle velocity in a run. As the air velocity is reduced, the normalized relative velocity number stays constant (near 1) for all runs until slugging or impending blockage begins. When slugging occurs, it typically starts in one or two runs which have the highest resistance to flow. The relative velocity number in these runs then begins to decrease, giving an indication that blockage is impending and that the air velocity should be increased to prevent blockage.

It is irrelevant that the absolute velocity in one set of runs may be different than the absolute velocity in another bank of runs when the normalization process is used. Control is based on the variations between runs in the same bank from the same meter. A relative drop detected in one or two runs is indicative of slugging, which can then be corrected by increasing the air flow in that particular bank of runs to prevent blockage.

For example, consider four tubes delivering product from a meter on an air cart. With the air flow initially set high enough to ensure that the product is flowing smoothly, the particle velocities measured could be:

$V1$=1200 fpm (particle velocity in tube 1, 1200 feet per minute)
$V2$=1150 fpm
$V3$=1050 fpm
$V4$=1000 fpm The average particle velocity can then be found:
$Va$=1100 fpm
The velocity ratio in each run relative to the average value can then be calculated:
$V1/Va$=1.091
$V2/Va$=1.045
$V3/Va$=0.955
$V4/Va$=0.909

These relative values are then used to normalize any subsequently measured velocity ratios in order to arrive at the relative velocity number (RVN):
$RVN1$=$(V1/Va)/1.091$
$RVN2$=$(V2/Va)/1.045$
$RVN3$=$(V3/Va)/0.955$
$RVN4$=$(V4/Va)/0.909$ Say the air velocity is now decreased slightly and the particle velocities all decrease in equal proportion:
$V1$=1080 fpm
$V2$=1035 fpm
$V3$=945 fpm
$V4$=900 fpm
Now, $Va$=990 fpm and:
$RVN1$=$(1080/990)1.091$=1.0
$RVN2$=$(1035/990)/1.045$=1.0
$RVN3$=$(945/990)/0.955$=1.0
$RVN4$=$(900/990)/0.909$=1.0

The RVNs are 1.0 and remain near this value as long as the particle velocities all decrease in equal proportion. If the air velocity is reduced enough, typically one or two runs will begin to have disproportionately large particle velocity decreases. This indicates the onset of slugging in the flow. This might appear as:

$V1$=972 fpm
$V2$=932 fpm
$V3$=800 fpm
$V4$=810 fpm
Now, $Va$=878.5 fpm and:
$RVN1$=$(972/878.5)/1.091$=1.01
$RVN2$=$(932/878.5)/1.045$=1.02
$RVN3$=$(800/878.5)/0.955$=0.95
$RVN4$=$(8101878.5)/0.909$=1.01

From this data, it is apparent that run 3 has had a much higher than average decrease in its particle velocity and that the flow may be (or may soon be) slugging. The control algorithm would detect that run 3 requires a boost and increase the air flow in all banks of runs for this meter until the RVNs stabilize near 1 again. The controller will check the average particle velocity when that critical point is reached and one RVN starts to drop and it would maintain the flow around that velocity or a bit higher. The limiting RVN would be checked periodically. If the product flow rate is changed by the user, then the system will again check the limiting RVN also.

In order for the adjuster (Step 120 in FIG. 5a) to automatically control air velocity, an air cart preferably has controls on the fan speed and a method of proportioning the overall air flow across the individual meters. Preferably, the air cart unit is outfitted with electric actuators to control fan speed as well as dampers in each of the air delivery runs. These actuators are electronically controlled with a remote unit which communicates via the communications bus. Commands to change the fan speed or individual damper positions as well as data on current fan speed are communicated on the communications bus.

The goal in setting the fan speed and damper positions is to attain the minimum product carry velocity in the flow from each of the meters. One skilled in the art will realize that the air flow speed throughout the air distribution system is important in maintaining good farming practices. Planting without adequate amounts of air in each set of runs will result in blockage of seed and debris. An excess of air flow in the runs will result in scattered patterns of seed placement in furrow due to seed bounce. Excess air flow velocity can also impact and damage seed. The control system of the present invention uses particle velocity measurements in each run to determine the minimum carry velocity for each set of runs, and will send out commands on the go to adjust fan speed and damper positions in order to maintain this minimum carry velocity. The control system includes its own electronic control unit which will be connected to the particle velocity sensors. This unit will process the velocity signals, perform the calculations for determining the minimum carry velocities, and send out commands for adjustments to fan speed and damper positions and display the results continuously to the user.

Air seeders can commonly include up to three or more tanks for application of up to three or more different products and three or more groups of delivery lines in the air distribution system. Each bank of runs will have a different optimum air flow based on the particular product, assuming multiple products are not blended into a single run. The goal is to obtain optimum particle velocity in each of three banks. Complications lie in the fact that there is only one air source for all three runs. Therefore, adjustments of fan speed or of the air damper in one run affect the air flow in all runs. Again with the use of particle velocity sensors, the goal is to automatically monitor and control fan speed and damper positions to maintain optimum particle velocity in each run even as particle flow rates change. Alternatively, particle velocity is continuously monitored to maintain optimum particle velocity in each run even as particle flow rates change.

However, air carts common in the industry allow for single shoot (FIG. 6a), double shoot (FIG. 6b and 6c) and triple shoot (FIG. 6d) applications as well. In single tank, single shoot applications, product is being delivered from only one tank. Only the fan speed would need to be controlled in order to adjust particle velocity. The damper for the active meter would be fully open and the other dampers would be closed. Multi-tank, single shoot applications involve blending products from two or more tanks into one run. The particle velocity sensors would be located after the point where the products are blended, so they will be measuring the velocity of the combined flow. The damper position of the meter with the higher product mass flow rate would be fully open, and the fan speed and the other damper position would be controlled. Double and triple shoot applications consist of separate product flows from two or more tanks right to the opener. In this situation, the damper from the high mass flow rate product would be fully open, and the fan speed and the other damper position (or positions in the case of triple shooting) would be controlled to balance the air flow amongst the runs.

A combination where two tanks are blended into one set of runs and product from a third tank travels in its own set of runs is also a common configuration used in the industry.

In multi-tank single shoot applications, products of different carry velocities travel in the same run. The larger product may drop out of the flow (below the sensor's field of view) and begin slugging while the lighter product could continue to flow over the top and thus mask the slugging going on. Two methods of countering this problem are considered. In one implementation, the correlation algorithm detects and processes the velocities of different sized particles separately.

By tracking the velocity of the heavier particle flow, it can also be controlled and thus prevented from dropping below the field of view of the sensor. Also, if its absence was detected by the sensor, a warning could be transmitted over the communications bus indicating a lack of product flow. A second implementation is the use of a "ramp". The ramp is placed immediately before the sensor at the bottom of the tube. Its function is to force particles moving along the bottom of the tube up into the sensor's field of view allowing their velocity to be measured.

In operation, metering of product would start at a high air rate in order to determine initial average velocities and relative velocity numbers (RVNs). The initial air flow rate would be based on product type and mass flow rate. Individual velocity readings would be filtered with a low pass filter in order to minimize the effects of the distribution of particle velocities for a given average velocity condition. Some filtering is carried out in the sensor microprocessor in order to attain a reading which can be tracked for sequential calculations of particle velocity. Further filtering and then the averaging and ratio calculations of individual velocities are carried out in the remote control electronic unit.

In the preferred embodiment of the control algorithm, RVNs are used directly, the system continuously monitors all runs and increments or decrements fan speed and damper settings to try to maintain RVNs just above a threshold value. At a given product flow rate, the critical average particle velocity is found to just maintain the minimum RVN above a threshold value. Average particle velocity means the average value across all runs in a bank for a particular meter. This critical velocity is used as a short-term set point for the control system. Use of a set point slightly above this value allows for delays in the control action and provide more margin of safety against plugging. The RVNs would also periodically be monitored in case adjustments in the particle velocity set point become necessary. When product flow rate increases, this will show up as a velocity decrease and the control system will counter this with an increase in air flow. This will also affect RVNs and the controller will continue to increase air flow as it adjusts for a new set point.

In the single tank, single shoot configuration, the active tank's damper is in the fully open position and the other dampers are closed. Once the initial air and product flow rates are set and the RVNs have been established, fan speed is decremented and conditions are allowed to stabilize for a fixed time period. The RVNs are then checked for any values which have decreased to below a preset threshold value. Based on the filter characteristics, a minimum number of consecutive readings below the threshold are required in order for the system to consider the threshold broken. If there are any tubes with a RVN below the threshold value, the last fan speed decrement is reversed and the previous setting of the fan speed is selected. This condition is monitored for a fixed time to ensure stability. If the lowest RVN or RVNs are still below the threshold, the fan speed is incremented again and the steady state condition is again checked. Once a stable operating condition is attained, the average particle velocity and the product flow rate setting are noted. As long as the product flow rate setting remains constant, the average velocity value measured acts as a short term set point for controlling the air flow. The fan RPM is increased or decreased based on short-term variations in the average particle velocity value. The RVNs are continuously monitored to ensure that none drop below the threshold. Periodically, the set point is retested by decreasing the fan speed and checking the RVNs for any significant decreases. If a fan speed adjustment is required based on a change in the RVNs, a new average particle velocity set point is found once a stable operating condition is again reached.

For the case of single shooting product from one tank, only the fan speed control described above would be required. For single shooting from two tanks, the damper from the higher product flow rate meter would be wide open, and the other damper would be set for an air flow in proportion to the relative mass flow rate of product from its meter.

In double or triple shooting, when one meter gets an increase in air flow with an increment in damper position, the air flow to the other meters will decrease initially. The control system will detect this as the average particle velocities begin to decrease in the runs with the decreasing air flow. This would be compensated for by incremental increases in damper position and fan speed. For the meter with the highest product flow rate, the damper would be fully open and control adjustments are applied directly to fan speed. So when there is a difference between the set point value of the average particle velocity and the current measured value (i.e. an error in the velocity), a change in fan RPM is commanded by the control system. Typically the magnitude of this change would be proportional to the error. Depending on the characteristics of the system, it may be determined that the change in fan speed should be related to the magnitude of the error, its rate of change, and/or its accumulated magnitude over time (proportional/derivative/integral control). The parameters used for the controller would be tuned to suit the characteristics of the system.

The above description also applies to the case of adjusting an air damper position to change the air flow rate (and thus particle velocity) in the runs from a given meter. The amount the damper is open or closed would be proportional to the error in the particle velocity (or possibly also related to the rate of change of the error or its accumulated magnitude over time). The position of the linear actuator operating the damper would be converted to a function which provides a reasonably linear change in air flow output for a given input. In other words, the commands to the damper actuators would be for air flow changes rather than simply actuator position changes.

Figure 7:
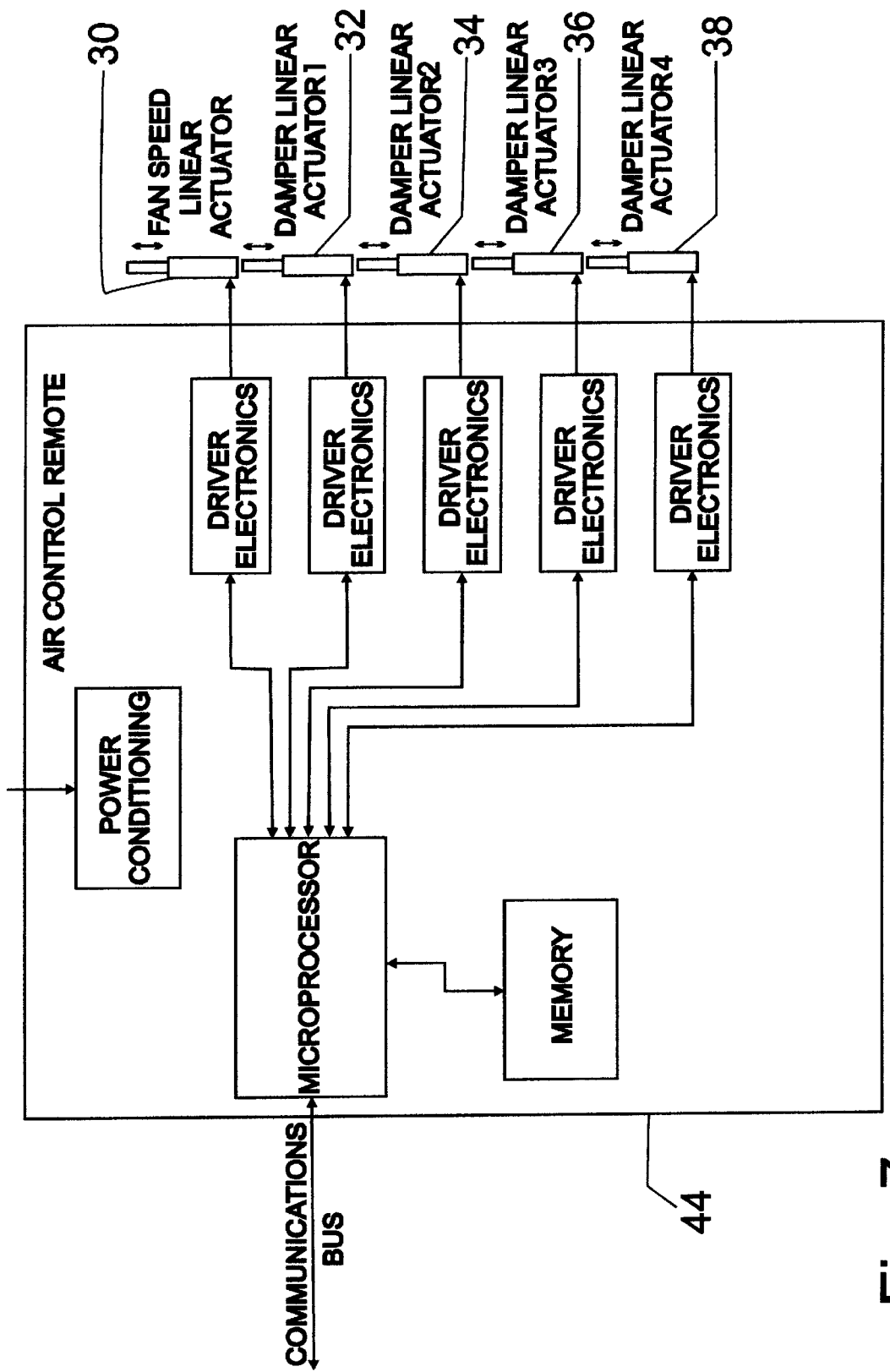
FIG. 7 is a block diagram of a controller in accordance with the present invention.
Figure 8:
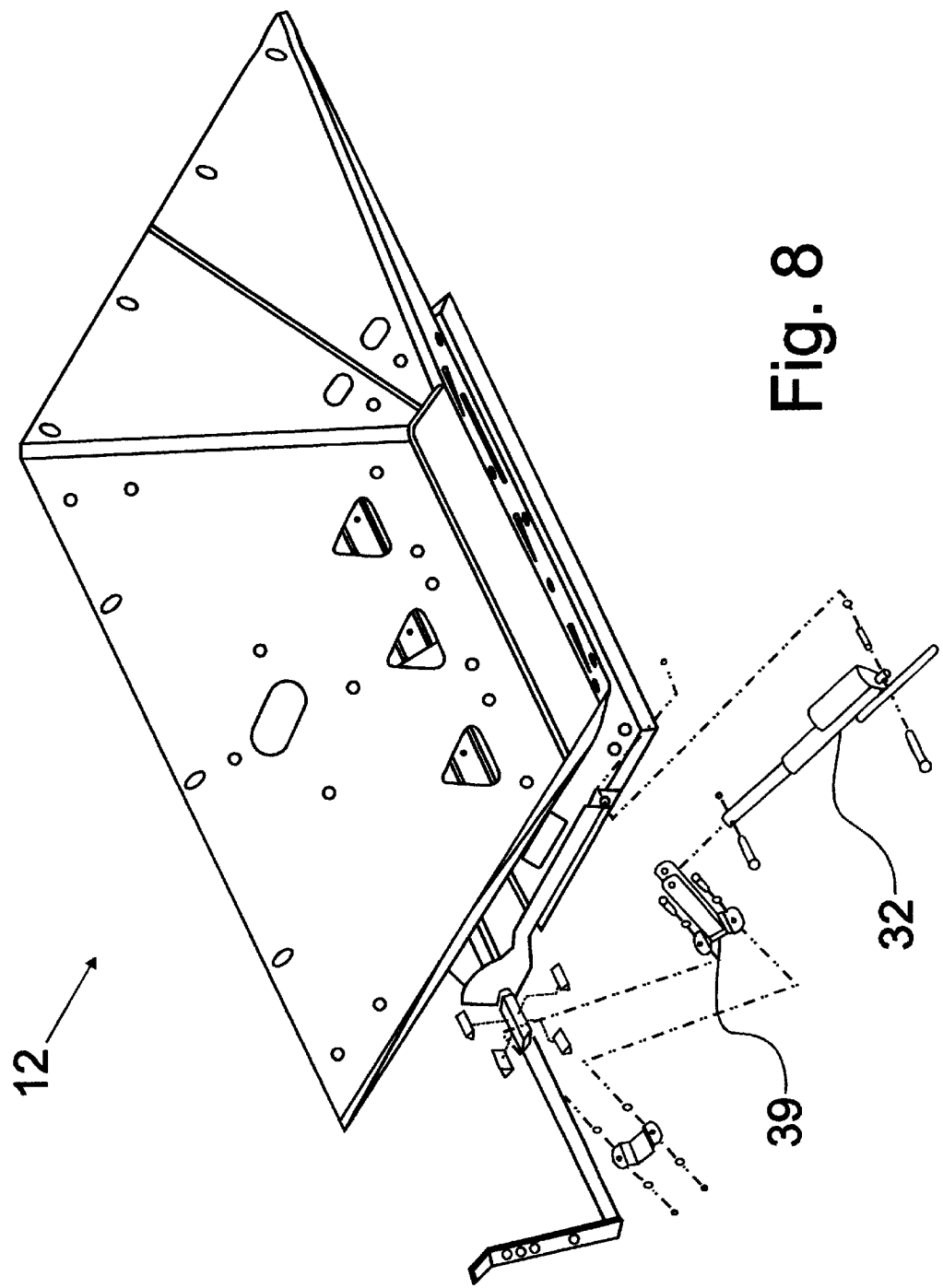
FIG. 8 is an exploded view showing an electric actuator on a tank for controlling the air damper position in accordance with the present invention.
Figure 9:
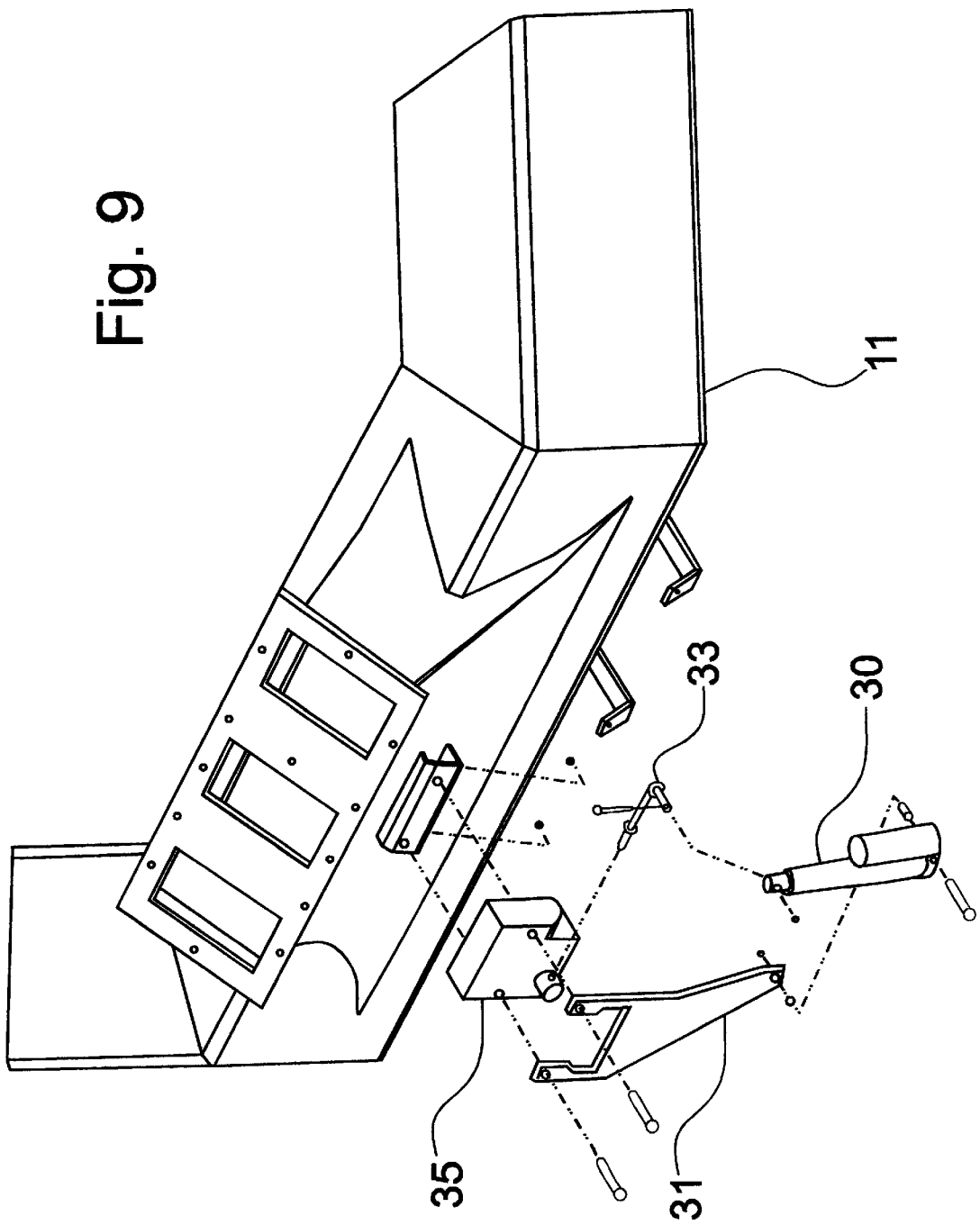
FIG. 9 is an exploded view showing a hydraulic flow control value and fan speed electric actuator on the air cart frame in accordance with the present invention.
Figure 10:
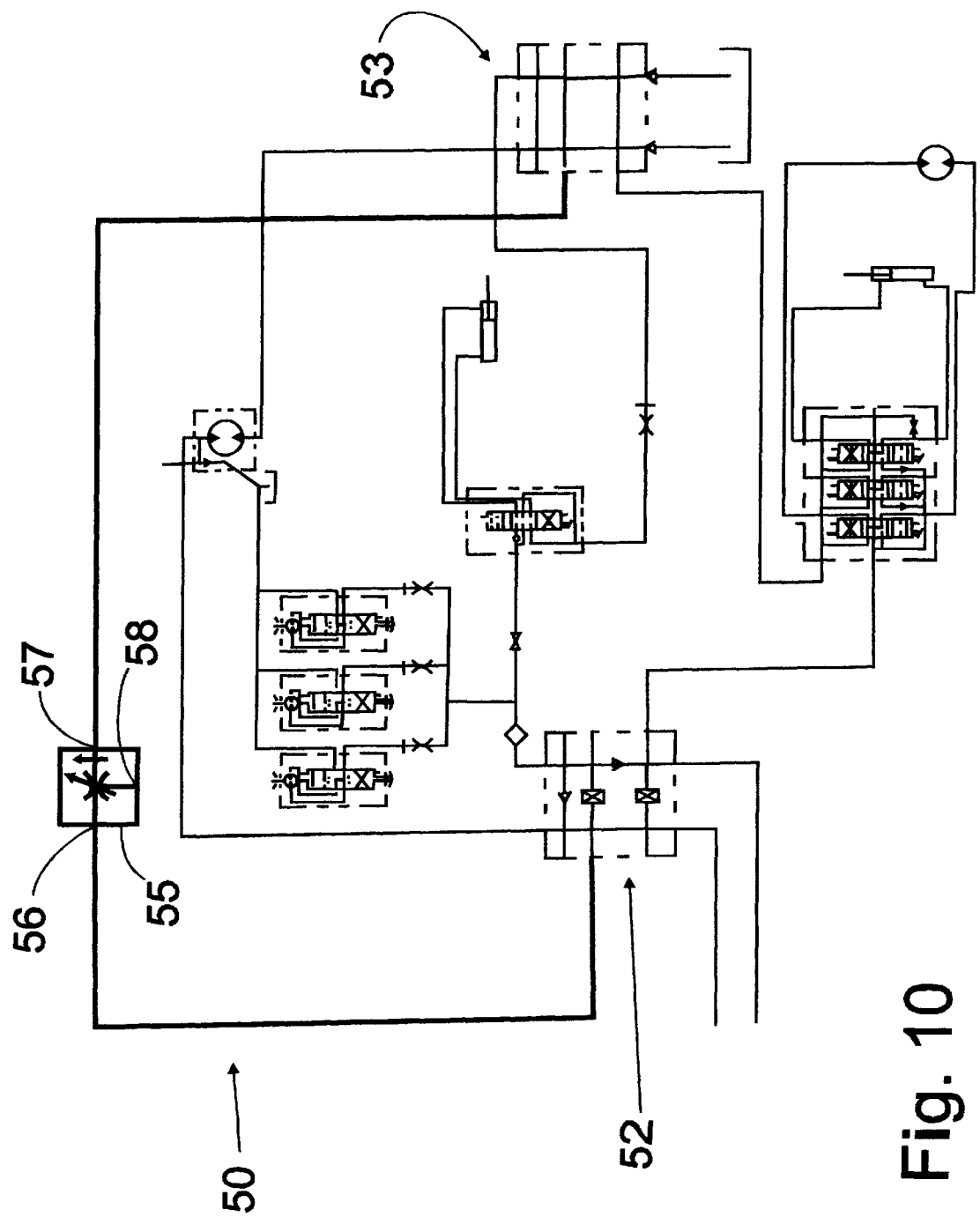
FIG. 10 is a hydraulic schematic diagram of an embodiment of the air flow control on a variable drive air cart in accordance with the present invention.

The input commands from the above mentioned algorithms are then transmitted from the particle velocity remote unit to the air cart remote by a conventional communications bus as seen in FIG. 7. The circuitry consists of a microprocessor, memory unit and driver electronics. One driver electronics circuit is required for each electric actuator. The preferred embodiment for the control system is for use on air carts with three air dampers and one fan, thus requiring four electric actuators, however, an alternative embodiment could use more or fewer actuators within the scope of the invention.

The microprocessor is configured to receive data inputted from the communications box and use this data to control the driver electronics. The driver electronics used in the air control system are such that they experience low power loss. The memory serves as a means of program storage and data storage. The microprocessor, memory unit and driver electronics are all standard components.

Each tank on the air cart unit is outfitted with one air damper electric actuator used to position the air damper of that particular tank. The air damper electric actuator 32 is bolted to the storage tank 12. The rod end of the linear actuator is bolted to an electric actuator control arm 39. The control arm is then pivotally mounted at a connection joint on the air cart frame 11 and is attached to the air damper 25. The other air damper electric actuators are mounted in a similar manner. Each of these air damper linear actuators is also connected to the air cart electric harness by an independent extension harness (not shown). The actuator control arm is bolted to the electric actuator and is pivotally mounted to the air cart frame. It is also attached to the air damper. Movement of the electric actuator and control arm results in proportional movement of the air damper, thus positioning it to achieve the desired air flow rate.

The fan speed linear actuator 30 is mounted to the hydraulic flow control valve 35, while the flow control valve is mounted to the air cart frame 11 with a mounted plate 31. The fan speed electric actuator is also connected to a flow control actuator arm 33. An extension harness is used to connect the fan speed electric actuator to the air cart electric harness (not shown).

Alternatively, fan speed may be controlled by controlling the speed of an engine driving the fan, or controlling the displacement of a variable displacement pump supplying hydraulic flow to the fan.

The hydraulic circuit is the preferred embodiment for a variable drive cart. The hydraulic flow control valve 35 is shown to have an "IN" port, a "CF" port and a "EX" port. The hydraulic fluid enters the hydraulic flow control valve via the pressure manifold 52 through the "IN" port. The control flow exits via the return manifold 53 through the "CF" port and the "EX" or excess flow port is fitted with a plug. The fan speed is adjusted by positioning the fan speed electric actuator which sets the hydraulic flow control valve and thereby sets the fan speed.

The entire system is operated by the user via a console unit located in the tractor cab. The console serves as the command means for the user (user inputs product flow rates, etc.) and also serves as the output means for the system (system outputs RVNs, system errors, etc.). With the RVNs being displayed on the console, the user is informed which run or runs are most resistant to flow and the flexible plastic hoses of the air distribution system may be configured to minimize that resistance and make the cart more efficient.

In variable rate application, the data obtained from particle velocity sensors can be used in conjunction with the automatic control system. Variable rate application is important because each area of the land is of a different composition, thus requiring different rates of product application. With current manual air flow control, it is impossible to continually adjust the air flow to optimum values as the product flow changes. However, with particle velocity sensors and automatic control in accordance with the present invention, the system could continually be kept near optimum values.

There are also a number of different particle velocity sensor embodiments which would improve optical signal strength through partially obscured windows. One option is to use pulsed instead of continuous optical transmission signals. This allows for much higher intensity drive signals to the transmitting LEDs because the shorter bursts of drive current can be of much higher amplitude, although the average power dissipated by the device remains the same or lower than with continuous operation. This also allows for synchronization so that the two transmitting LEDs are never on at the same time. In this way, the transmitters may be located adjacent to each other, simplifying circuit design and reducing the need for tunnels for the optic devices.

Another embodiment of the particle velocity sensor would utilize drive signal amplitude control, used to maintain the minimum amount of intensity required for the receiver to "see" the light transmitted through the windows. When windows are clear, the minimum amplitude of LED transmitter drive current pulse is used which prevents the receiver from being saturated with light when small particles may be in the beam and should be detected. As the sensor window becomes more obscured, higher LED current pulse amplitudes are used to ensure that the optical receiver sees the transmitted signal.

A third embodiment uses receiver gain control, used also as described above to prevent saturation and to allow for more sensitivity as the window becomes more obscured.

There are also other algorithms for the automatic air flow control. A second method involves the basic function of determining the minimum particle velocities to maintain the RVNs above a threshold value similar to that of the first method. The difference involves the method of responding to changes in product flow rates. Instead of responding to errors in particle velocity as a product flow rate change takes place, commands for product flow rate changes would be monitored by the control system.

When a change in product flow rate is sent out on the CAN bus, the air velocity control system would begin to respond to it at the same time as the product metering system. Using a simple model of the air system on a cart, an initial adjustment in the air flow rates is made for all active runs. This adjustment is proportional to the change in mass flow rate of product in each run. After this initial adjustment, the control action as described in Method 1 would be used to seek out the new average particle velocity in each set of runs which resulted in operation just above the RVN threshold.

A third method is similar to the second method, but instead of using a model of the air system to arrive at approximate air flow adjustments to carry certain product mass flow rates, the model is based on average particle velocities required to carry certain mass flow rates. In this case, when a command for a change in product flow rate is detected by the control system, it immediately starts adjusting fan speed and damper positions in order to attain a change in average particle velocity for each meter proportional to the change in product mass flow rate for that meter. Once the fan speed and damper position adjustments stabilize, the same control action as described in the first method would be used to optimize the air velocities.

Among the advantages achieved are the following. Means are provided for automatically monitoring and controlling fan speed and damping mechanisms to maintain the system at optimum air flow settings on the go. The method of controlling an air cart does not require user intervention after initial settings are made. The system can sense various products and a wide range of velocities and control air flow regardless of products and configuration used. The means of maintaining correct air velocity levels in an air cart is simplified. Embodiments of the invention can automatically maintain optimum air flow settings to carry products without blockage while lowering power requirements. There is no need for a separate system to monitor blockage in the banks of runs, empty tanks or product bridging in a tank. Embodiments of the invention can continuously monitor air flow settings to ensure products are being carried without blockage while lowering power requirements.

In one embodiment, wherein there is no automatic control of the air flow, the apparatus for controlling the flow of air in the air cart unit 10 includes a console 40, typically placed in the cab of the prime mover, such as a tractor (not shown), to which the air cart unit 10 is conventionally coupled to provide operative and motive power to the air cart unit 10. The console 40 and display panel 42, from where fan speed and damper settings are controlled, is depicted in FIG. 11. The console 40 has a keypad 45 for data entry and scrolling. Included on the keypad are the on/off key 46, the alarm key 47, and various selection keys 48. The increase 49 and decrease 49*a* keys are used in setting the values for fan speed and air flow speed. A display screen 43 is also on the console 40 to provide a means of output data to the operator.

The control commands are entered via the keypad 45 by the operator. The operator sets the desired fan speed using the increase an decrease keys on the console and display panel. The air dampers in each air flow tube 21 are also set by using the increase and decrease keys on the control and display panel. A velocity number is determined by a method outlined below with respect to setting the fan speed and is dependent upon the types of seed being planted, and whether a single, double or triple shoot configuration is being used. The velocity is adjusted using the increase and decrease keys on the control and display panel. The manipulations of the increase or decrease keys effects adjustment of the position of the linear actuator, which in turn will adjust the air damper accordingly and demonstrate the resultant velocity change on the display panel.

The input commands are then transmitted from the console unit 40 to the remote electronic circuitry 44, schematically represented by the air flow control remote block diagram of FIG. 7, by a conventional communications bus. The electronic circuitry 44 is located within the remote unit. The circuitry 44 consists of a microprocessor, memory unit and driver electronics.

Once the system has positioned the air dampers 25, particle velocity sensors read the air flow rate and output the data on the display screen 43. The particle velocity sensors are locate din the meter ports 28 on each bank of tubes on the air seeder 10.

If the output data is not the desired value, then the operator simply adjusts the value (either the velocity number or the fan speed) using the increase and decrease keys on the console unit.

The air control system is also equipped with an error/alarm signal. The alarm key 47 on the console and display panel 42 is used to acknowledge and recall alarms from the air cart monitoring electronics including air flow. A variety of error messages that appear on the display screen 43 are available to inform the operator of any malfunctions.

To set fan speed, the operator would go through the following steps: set the console so that it displays the fan speed screen; select the to prow of the display using the top select key; and set the desired RPM as determined by velocity charts common in the industry using the increase (+) or decrease (−) keys on the console unit.

Then to set air flow at each metering roll, the operator will go through the following steps: set the console so that it displays the air flow screen; select the tank for which the air flow must be set; set the desired air flow value by using the increase (+) or decrease (−) keys on the console unit to set the velocity number as determined by the method already known in the art, which is to determine the "total rate"; then calculate the equivalent rate, and then approximate the velocity number from a known velocity chart, such as shown in FIG. 12; wait five to thirty seconds to ensure that accurate readings are made; and if the air flow reading is not the desired air flow value, the operator must repeat the steps above until the displayed value is the desired air flow value.

The above procedure must be repeated for each tank for which the air flow must be set.

One skilled in the art will realize that the air flow speed throughout the air distribution system is important in maintaining good fanning practices. Planting without adequate amounts of air in each set of runs will result in scattered patterns of seed placement in furrows due to seed bounce. Excess air flow velocity can also impact and damage seed. Therefore, prior art utilizes air dampers to control the air flow settings throughout the air distribution system. These dampers are commonly set by adjustment levers for each bank of tubes. Rotating the handle either closes or opens the air dampers. With the present invention, the use of the adjustment lever is eliminated.

The operator first sets the desired value for fan speed (rpm). A specific fan speed value is recommended depending upon the number of runs used and the type of product being distributed.

The increase or decrease command is, then, transmitted from the console unit to the remote electronic circuitry by the communications bus. The remote unit receives the command and transfers the data to the driver electronics which controls the hydraulics circuit. The hydraulic circuit includes a hydraulic flow control valve and an electric linear actuator used in controlling the fan speed. The position of the fan speed linear actuator positions the hydraulic flow control valve and sets the fan speed rate.

The operator, then, sets a velocity number as determined by a simple calculation defined above by using the increase and decrease keys on the console unit. A separate velocity number is entered for each set of runs. Again, the increase or decrease command is transmitted from the console to the electronic circuitry by a communications bus. The driver electronics receive the command and transfer the data to the driver electronics which control the hydraulics circuit.

When an increase or decrease command for a particular air camper is entered by the operator in the console unit, each corresponding linear actuator is positioned. The actuator control arm is bolted to the linear actuator and is pivotally mounted to the air cart frame. It is also attached to the air damper. Movement of the linear actuator and control arm results in a proportional movement of the air damper, thus positioning it to achieve the desired air flow rate.

Once the linear actuators have set the fan speed and positioned the air dampers, velocity sensors read the air flow rate, which are transmitted to the console on the communications bus and then the data is output on the display screen. This allows the operator to make adjustments to the fan and damper settings if the actual flow rate is not the desired rate. This process is repeated until the desired setting is reached for each tank.

The output data from the velocity sensors also informs the operator of any changes or fluctuations in the air speed during operation. In this way, the operator is always informed of the present air flow rates and can make any necessary changes on the go in order to keep the desired fan speed and air flow rates during operation.

The air control system is also designed to send error/alarm signals to the console unit. A variety of error messages are available to inform the operator of any malfunctions during operation.

While the present invention has been described in connection with what is presently considered to be the most practical and preferred embodiments, it is to be understood that the invention is not limited to the disclosed embodiments. To the contrary, the present invention is intended to cover various modifications, variations, adaptations and equivalent arrangements included within the spirit and the scope of the appended claims. The scope of the claims is to be accorded the broadest interpretation so as to encompass all such modifications and equivalent structures and functions.

Having thus described the invention, what is claimed is:

1. In an air seeder implement for planting agricultural crops, said air seeder having a frame; at least two storage tanks mounted on said frame to contain a supply of first and second products to be planted into the ground; a fan mounted on said frame and being operable to create a flow of air; a fan drive mechanism operably connected to said fan to power the rotation of said fan through a range of speeds; a bank of air flow tubes corresponding to each said storage tank and being operably associated with said fan to receive said flow of air therethrough; and air dampers mounted within each said bank of air flow tubes for rotation relative thereto, said air dampers being operable to restrict the flow of air through said bank of air flow tubes as a function of the rotated position of said air dampers between a fully open position in which the flow of air is unrestricted through said bank of air flow tubes and a closed position in which the flow of air is fully restricted from flowing through said bank of air flow tubes, a control system for controlling the flow of air through said bank of air flow tubes comprising:

a first actuator operably connected to said air dampers for a first bank of air flow tubes corresponding to a first storage tank to effect rotation thereof between said open and closed positions;

a second actuator operable connected to said air dampers for a second bank of air flow tubes corresponding to a second storage tank to effect rotation thereof between said open and closed positions;

a third actuator operably connected to said fan drive mechanism and being operable to vary the speed of operation of said fan and, thereby, effect a selective variance in the velocity of said air flow into said banks of air flow tubes;

a control mechanism comprising a microprocessor, driver electronics controlled by said microprocessor for independent manipulation of each said actuator, and a control panel having input keys for inputting data into said microprocessor, the control mechanism being operably connected to each said actuator for independent selective control thereof, whereby each said actuator can be selectively manipulated to control the velocity of air flowing through each said bank of air flow tubes; and a particle velocity sensor corresponding to each said bank of air flow tubes, said control panel being operable to display a numerical representation corresponding to each sensed particle velocity.

2. The air seeder implement of claim 1, wherein the velocity of the particles flowing through each said bank of air flow tubes can be varied independently by manipulation of said control panel to effect corresponding manipulation of each said actuator.

3. The air seeder of claim 1 wherein the particle velocity sensor comprises:

a. an upstream sensor located at the tube to detect particles at a first location in the tube; and b. a downstream sensor located at the tube to detect particles at a second location in the tube, the second location being a known distance downstream of the first location.

4. The air seeder of claim 3 wherein each of the upstream and downstream sensors is a light beam interruption sensor comprising an optical transmitter and an optical receiver.

5. The air seeder of claim 4 wherein the transmitter is a light emitting diode, and the receiver is a near IR phototransistor.

6. The air seeder of claim 5 wherein the optical transmitter and optical receiver of the upstream sensor are coplanar, and the optical transmitter and optical receiver of the downstream sensor are coplanar.

7. The air seeder of claim 6 wherein the optical transmitter of the upstream sensor is located adjacent the optical receiver of the downstream sensor, and the optical receiver of the upstream sensor is located adjacent the optical transmitter of the downstream sensor.

8. The air seeder of claim 7 wherein the conduit comprises light tunnels into which the transmitters and receivers of the upstream and downstream sensors are mounted.

9. An air seeder for planting agricultural crops, the air seeder comprising:
   a. a storage tank for containing particles to be dispensed;
   b. a metering mechanism for transferring particles from the storage tank;
   c. an air distribution system for receiving particles from the metering mechanism, the air distribution system comprising:
      i. a bank of tubes for transporting particles in a flow of air having a flow rate; and
      ii. a damper mechanism at the bank of tubes for selective control of the flow rate within the bank of tubes;
   d. an air flow source for providing a flow of air to the bank of tubes;
   e. a particle velocity sensor located at each tube for providing a sensor output signal corresponding to a measured particle velocity; and
   f. a control mechanism operably connected to the sensors and to the damper mechanism for selective adjustment of the flow rate in the bank of tubes, the control mechanism being adapted to receive the sensor output signals, normalize the values corresponding to the sensor output signals, and display the normalized values.

10. The air seeder of claim 9 wherein the particle velocity sensor comprises:
    a. an upstream sensor located at the tube to detect particles at a first location in the tube; and
    b. a downstream sensor located at the tube to detect particles at a second location in the tube, the second location being a known distance downstream of the first location.

11. The air seeder of claim 10 wherein the particle velocity sensor comprises:
    a. an upstream sensor located at the tube to detect particles at a first location in the tube; and
    b. a downstream sensor located at the tube to detect particles at a second location in the tube, the second location being a known distance downstream of the first location.

12. The air seeder of claim 11, wherein each of the upstream and downstream sensors is a light beam interruption sensor comprising an optical transmitter and an optical receiver.

13. The air seeder of claim 12, wherein the transmitter is a light emitting diode, and the receiver is a near IR phototransistor.

14. The air seeder of claim 13, wherein the optical transmitter and optical receiver of the upstream sensor are coplanar, and the optical transmitter and optical receiver of the downstream sensor are coplanar.

15. The air seeder of claim 14, wherein the optical transmitter of the upstream sensor is located adjacent the optical receiver of the downstream sensor, and the optical receiver of the upstream sensor is located adjacent the optical transmitter of the downstream sensor.

16. The air seeder of claim 15, wherein the conduit comprises light tunnels into which the transmitters and receivers of the upstream and downstream sensors are mounted.

* * * * *